United States Patent
Kondos

(10) Patent No.: US 11,905,428 B2
(45) Date of Patent: Feb. 20, 2024

(54) RESIN COMPOSITIONS AND METHODS OF PRODUCTION

(71) Applicant: Momentive Performance Materials Inc., Waterford, NY (US)

(72) Inventor: Constantine A. Kondos, White Plains, NY (US)

(73) Assignee: Momentive Performance Materials Inc., Waterford, NY (US)

(*) Notice: Subject to any disclaimer, the term of this patent is extended or adjusted under 35 U.S.C. 154(b) by 210 days.

(21) Appl. No.: 17/427,371

(22) PCT Filed: Feb. 3, 2020

(86) PCT No.: PCT/US2020/016340
§ 371 (c)(1),
(2) Date: Jul. 30, 2021

(87) PCT Pub. No.: WO2020/167507
PCT Pub. Date: Aug. 20, 2020

(65) Prior Publication Data
US 2022/0145115 A1    May 12, 2022

Related U.S. Application Data

(60) Provisional application No. 62/803,684, filed on Feb. 11, 2019.

(51) Int. Cl.
| | | |
|---|---|---|
| *C09D 133/08* | (2006.01) | |
| *C08L 69/00* | (2006.01) | |
| *C09D 7/61* | (2018.01) | |
| *C08G 64/02* | (2006.01) | |
| *C08L 33/08* | (2006.01) | |
| *C09D 169/00* | (2006.01) | |

(52) U.S. Cl.
CPC ....... *C09D 133/08* (2013.01); *C08G 64/0266* (2013.01); *C08L 33/08* (2013.01); *C08L 69/00* (2013.01); *C09D 7/61* (2018.01); *C09D 169/00* (2013.01)

(58) Field of Classification Search
CPC ...... C09D 133/08; C09D 7/61; C09D 169/00; C09D 5/00; C08G 64/0266; C08L 33/08; C08L 69/00; C08L 63/00
See application file for complete search history.

(56) References Cited

U.S. PATENT DOCUMENTS

| | | | | |
|---|---|---|---|---|
| 10,190,016 | B2* | 1/2019 | Tsunoda | C09D 7/63 |
| 2012/0276373 | A1* | 11/2012 | Port | C09D 175/16 |
| | | | | 524/521 |
| 2014/0348776 | A1* | 11/2014 | Palmer, Jr. | C08K 3/20 |
| | | | | 428/35.8 |
| 2017/0260317 | A1* | 9/2017 | Kondos | C08G 18/755 |
| 2019/0016915 | A1* | 1/2019 | Schaefer | C09D 161/32 |

FOREIGN PATENT DOCUMENTS

GB    2479075 A    9/2011

OTHER PUBLICATIONS

Ineos Melamines, Resimene(r) 755, Technical Data Sheet (Year: 2007).*
International Search Report from International Appplocation No. PCT/US2020/016340 dated May 26, 2020.

* cited by examiner

*Primary Examiner* — Heidi R Kelley
*Assistant Examiner* — Surbhi M Du
(74) *Attorney, Agent, or Firm* — James C. Abruzzo

(57) ABSTRACT

A resin composition containing an organic resin (i) containing carboxylic acid ester and/or ether functional groups and optionally other halo groups, amino groups, hydroxyl groups, carboxylic acid groups and cyano groups and a moisture-curable silylated polycarbonate resin (ii) derived from a copolycarbonate diol, prepared from diol(s) having even numbers of carbon atoms and odd number of carbon atoms and coatings formulated using these resin compositions.

27 Claims, No Drawings

RESIN COMPOSITIONS AND METHODS OF PRODUCTION

FIELD OF THE INVENTION

The invention relates to resin compositions that include an organic resin containing carboxylic acid ester and/or ether functional group(s) and a moisture-curable silylated polycarbonate resin, in which the moisture-curable silylated polycarbonate is soluble in the organic resin, the use of these resin composition in the preparation of coatings, sealants, adhesives or other formulated products, and their methods of production.

BACKGROUND OF THE INVENTION

Various organic resins are commonly incorporated into coating formulations. Organic resins containing ester groups, ether groups or a combination of ester and ether groups often suffer from unsatisfactory performance properties, such as unsatisfactory weatherability. Exposure to sun, rain or corrosive chemicals, such as salt water, often result in the degradation of the resin. Resin degradation can be indicated by loss of gloss, cracking, embrittlement and/or loss of adhesion to substrates, especially metal substrates, due in part to the corrosion of the metal. These organic resins containing ester groups, ether groups or a combination of ester and ether groups may exhibit poor UV resistance, especially in humid or wet environments.

Resistance to weathering can be evaluated with QUV tests, which are accelerated weathering tests. These tests can reproduce the damage caused by sunlight, rain, dew and other natural weathering environments. Ultraviolet light (UV) resistance of these organic resin may be dependent on the wavelength of the ultraviolet light. The resistance of the organic resins to different wavelengths of ultraviolet light is often measured in the accelerated QUV testing by using two different UV wavelengths. The effects of lower energy, longer ultraviolet light wavelengths can be assessed in accelerated QUV testing using UVA, and the effects of higher energy, shorted ultraviolet light wavelengths, can be assessed using UVB. The effects of moisture and corrosion can be determined using either water spray or salt spray during the QUV testing cycle.

These and other shortcomings of these organic resins containing ester, ether or ester and ether linkages have limited the widespread use of these organic resins in a wide variety of high performance coatings and other applications.

One common way to overcome deficiencies observed in these organic resins is by employing a multilayer system. For example, a two-component (2K) epoxy primer can be used to coat the substrate, followed by the application of a one-component thermoplastic organic resin base coat. This thermoplastic organic resin base coat can then be covered with a two-component urethane clear coat, which contains UV absorbers and hindered amine stabilizers (HALS). The primer layer can improve adhesion to the substrate and the topcoat (clear coat) can improve weather and chemical resistance of the three layer coating system. Such a system is often found in automotive applications. However, these UV absorber and HALS in the topcoat can leach from the clear coat composition or may degrade on exposure to weathering conditions, thereby losing their efficacy to protect the thermoplastic organic resin base coat. The use of three different coatings and two-component coatings may also be undesirable as compared to systems with fewer coatings and single component (1K) systems, due to the additional costs of application and delamination of the three layer coating system.

Another way that has been used to overcome inadequacies of thermoplastic coatings is to incorporate a curing agent, such as a polyisocyanate, directly into the organic resin composition. Organic resins in such systems may or may not have reactive groups that can react with the isocyanate to form a thermoset coating. Organic resins which lack active hydrogen functional groups will not react with the polyisocyanates, thereby providing little benefit. Organic resin which possess active hydrogen groups may react with the polyisocyanate curing agents, to form a crosslinked resin composition. However, these organic resins which possess ester and/or ether linkages may still be susceptible to degradation, resulting in a decrease in gloss as well as other desirable end-use properties. These organic resin compositions containing curing agents may adequately not address the degradation due to weathering of the coating and therefore have not been shown to be fully satisfactory.

One-component thermoplastic organic resins containing ester, ether or ester and ether functional groups are often formulated into coatings containing air drying resins. These airdrying resins are typically high glass transition temperature monomers. However, such single component formulations typically provide the least robust coatings, because the air drying resins often are susceptible to air oxidation, resulting in a deterioration in gloss and embrittlement, when the coating formulations are exposed to environmental effects.

Problems with poor adhesion have often been addressed by the use of etch primers. These are typically single component metal primers formulated with a combination of resins to maximize adhesion to the various metal surfaces on which they may be used. Commonly, a small amount of phosphoric acid or other etching material is present in these primers to roughen the metal surface and thereby improve adhesion. However, depending on how the metal substrate is treated or prepared prior to application, even the use of etch primers often does not result in suitable adhesion. Poor adhesion of the coating to the metal substrate may result in corrosion of the metal as moisture or salts cause the de-bonding of the coating from the substrate and may result in bringing the metal substrate in contact with the water or salts. Furthermore, the use of acids and other etching materials can be detrimental to the environmental, may expose workers to the corrosive materials and is labor intensive.

Accordingly, it is desirable to provide improved resin compositions including organic resins that overcome deficiencies of the prior art.

SUMMARY OF THE INVENTION

Generally speaking, in accordance with the invention, resin compositions are provided, which can provide advantages in weathering, adhesion, protection and the like. In accordance with one embodiment of the invention, there is provided a resin composition comprising:

(i) an organic resin containing at least one functional group selected from the group consisting of carboxylic acid esters and/or ethers; and (ii) a moisture-curable silylated polycarbonate resin of the general formula (I):

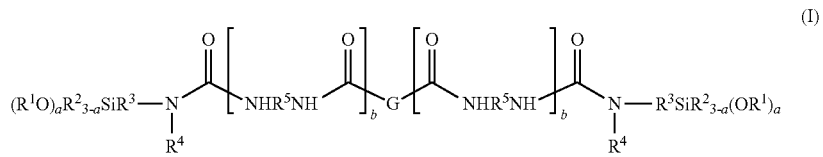

wherein:
G is a moiety of general structure (II):

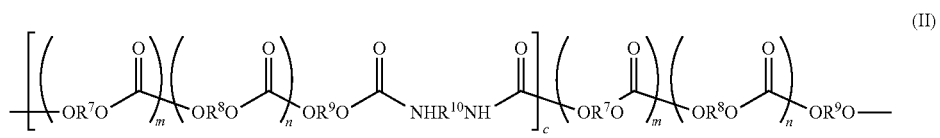

in which:
each $R^1$ is independently an alkyl group of from 1 to 6 carbon atoms;
each $R^2$ is independently an alkyl group of from 1 to 4 carbon atoms or phenyl group;
each $R^3$ is independently an alkylene group of from 1 to 12 carbon atoms;
each $R^4$ is independently an alkyl group of from 1 to 6 carbon atoms, phenyl group, hydrogen or —$R^3SiR^2_{3-a}(OR^1)_a$ group;
each $R^5$ is independently a divalent organic group selected from the group consisting of an alkylene group having 1 to 16 carbon atoms, a cycloalkylene group having 5 to 16 carbon atoms and the group $X^1$ having the general formula (III):

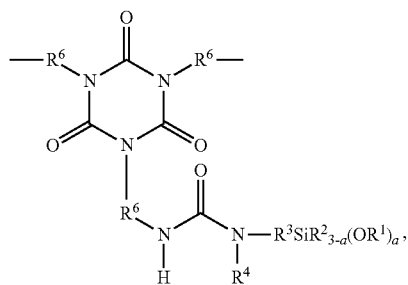

in which:
each $R^6$ is independently an alkylene group of from 1 to 12 carbon atoms or a cycloalkylene group of from 5 to 16 carbon atoms;
each $R^7$ is an alkylene group of from 2 to 12 carbon atoms;
each $R^8$ is an alkylene group of from 2 to 12 carbon atoms;
each $R^9$ is independently $R^7$ or $R^8$;
each $R^{10}$ is independently a divalent organic group selected from the group consisting of an alkylene group of from 1 to 12 carbon atoms, a cycloalkylene group of from 5 to 16 carbon atoms, $X^1$ and the group $X^2$ having the general formula (IV):

(IV)

and,
subscripts a, b, c, m and n are integers, wherein a is 1 to 3; b is 0 or 1; c is 0 to 5; m is 1 to 100; and, n is 0 to 100, with the provisos that when b is 0, $R^4$ is hydrogen; when n is 0, $R^7$ is a branched alkylene group of from 3 to 12 carbon atoms; and,
when n is 1 to 100, $R^7$ and $R^8$ are different alkylene groups,
wherein the moisture-curable silylated polycarbonate resin (ii) is soluble within the organic resin (i).

The resin composition includes the moisture-curable silylated polycarbonate resin (ii) to provide enhanced durability, in particular, resistance to weathering due to exposure to light, moisture and corrosive materials, to the organic resin (i). Such addition may enhance other properties of the organic resin (i). The resin compositions are therefore particularly well suited as components used in coating formulations in which the dried or cured coatings are exposed to weathering during their life.

The organic resins (i) include acrylic resins, acrylate-containing resins, epoxy resins, melamine resins, alkyd resins, polyester resins, vinyl ether resins, vinyl acetate resins and cellulose acetate butyrate resins. The organic resins (i) may be thermoplastic or thermosetting resins. The resin may also contain other functional groups, such as for example, fluoro groups, amino groups, carboxylic acid groups, hydroxyl groups and the like.

The resin compositions containing the organic resins (i) and the moisture-curable silylated polycarbonate resins may exhibit significant improvement in gloss and color retention in QUV testing and improved adhesion compared to resin compositions containing the organic resins, but not the moisture-curable silylated polycarbonate resins (i).

As discussed herein, preferred coating compositions, in accordance with the invention, can also be prepared by post-addition of a silicone thermal hardcoat to a moisture-curable silylated polycarbonate resin(s). These silicone thermal hardcoats are preferably based on inorganic polysiloxane backbones and can contain silanols and/or alkoxysilyl groups which cure upon heating, to form cross-linked polysiloxane resins. These silicone thermal hardcoats preferably contain polysiloxane bonds, which do not have strong absorptions in the ultraviolet radiation region of the spectrum and do not readily undergo degradation when exposed to weathering effects. These silicone thermal hardcoats do not suffer from the weathering effects that are often found with organic resins containing ester, ether or ester and ether functional groups. Other objects and advantages of the invention will be apparent from the specification and drawings.

DETAILED DESCRIPTION OF THE PREFERRED EMBODIMENTS

In the specification and claims herein, the following terms and expressions are to be understood as indicated.

The singular forms "a," "an," and "the" include the plural, and reference to a particular numerical value includes at least that particular value, unless the context clearly dictates otherwise.

Other than in the working examples or where otherwise indicated, all numbers expressing amounts of materials, reaction conditions, time durations, quantified properties of materials, and so forth, stated in the specification and claims are to be understood as being modified in all instances by the term "about".

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

The terms, "comprising," "including," "containing," "characterized by," and grammatical equivalents thereof are inclusive or open-ended terms that do not exclude additional, unrecited elements or method steps, but will also be understood to include the more restrictive terms "consisting of" and "consisting essentially of."

It will be understood that any numerical range recited herein includes all sub-ranges within that range and any combination of the various endpoints of such ranges or sub-ranges.

As used herein, integer values of stoichiometric subscripts refer to molecular species and non-integer values of stoichiometric subscripts refer to a mixture of molecular species on a molecular weight average basis, a number average basis or a mole fraction basis.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "hydrocarbon group" or "hydrocarbon radical" means any hydrocarbon from which one or more hydrogen atoms has been removed and is inclusive of alkyl, alkenyl, alkynyl, cyclic alkyl, cyclic alkenyl, cyclic alkynyl, aryl, aralkyl and arenyl groups and is inclusive of hydrocarbon groups containing at least one heteroatom.

The term "alkyl" means any monovalent, saturated straight, branched or cyclic hydrocarbon group; the term "alkenyl" means any monovalent straight, branched, or cyclic hydrocarbon group containing one or more carbon-carbon double bonds where the site of attachment of the group can be either at a carbon-carbon double bond or elsewhere therein; and, the term "alkynyl" means any monovalent straight, branched, or cyclic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The expression "organic resin" as used herein means any organic polymeric liquid which, when converted into its final state for use, becomes solid, and any of a class of solid or semisolid organic materials of natural or synthetic origins with no defined melting point and generally of high molecular weight.

The expression "carboxylic acid ester group" as used herein means a functional group containing two oxygen and carbon atom and having the structure —C(=O)O—, where the open valences are bonded to carbon atoms.

The expression "ether group" as used herein means a functional group containing an oxygen, —O—, where the open valences are bonded to carbon atoms. The expression "ether group" includes acyclic and cyclic structures, as for example an epoxy group.

The term, "soluble" as used herein with respect to the organic resin (i), means that the organic resin (i), when combined with the moisture-curable silylated polycarbonate resin (ii), forms a uniformly dispersed mixture, at the molecular level, of the moisture-curable silylated polycarbonate resin (ii) in the organic resin (i) thereby forming a solution.

In one embodiment of the invention, the solubility of the moisture-curable silylated polycarbonate resin (ii) in the organic resin (i) is determine using Hansen solubility parameter and the equation:

$$[4(22.5-\delta_d)^2+(9.0-\delta_p)^2+(9.0-\delta_h)^2]^{0.5}=R'$$

wherein $\delta_d$ is the Hansen dispersion solubility parameter, $\delta_p$ is the Hansen polar solubility parameter and $\delta_h$ is the Hansen hydrogen bonding parameter of the organic resin (i) determined at 25° C., and R' is the solubility parameter distance between the moisture-curable silylated polycarbonate resin (ii) and the organic resin (i). If the R' for a given resin is about less than or equal to 9.0, preferably from 0.0 to 7.0 and more preferably from 0.0 to 5.0, then the moisture-curable silylated polycarbonate resin (ii) is considered soluble in the organic resin (i). If the value of R' is greater than 9, the moisture-curable silylated polycarbonate resin (ii) is considered to be not soluble in the organic resin (i).

The Hansen dispersion, polar and hydrogen bonding parameters for the organic resins (i) can be determined in accordance with the procedures describe in: Hansen, C. M., The three dimensional solubility parameter—key to paint component affinities, I. *J. Paint Technol.*, 39(505), 104-117 (1967). The Hansen solubility parameters have been tabulated for various organic resins and can be found in: Hansen Solubility Parameters A User's Handbook, $2^{nd}$ edition, C. M. Hansen, CRC Press Taylor & Francis Group, Boca Raton, 2007, page 493-505. The Hansen solubility parameters were presented in Appendix A, Table A.2.

In another embodiment, the determination of the solubility of the moisture-curable silylated polycarbonate resin (ii) in the organic resin (i) can be determined by mixing 7.0 grams of the organic resin (i) with 1.13 grams of n-butyl acetate until a clear solution is obtained. The temperature of the organic resin (i) and n-butyl acetate mixture is maintained at 25° C. using a constant temperature bath. The moisture-curable silylated polycarbonate (ii) (1.88 grams) is added and stirred for 12 hours. The mixture of organic resin (i), moisture-curable silylated polycarbonate (ii) and n-butyl acetate is drawn down onto a glass slide using a 150 micron drawdown square and the n-butyl acetate is evaporated to form a dry film of organic resin (i) and moisture-curable silylated polycarbonate resin (ii). The cast film is placed into a microscope and the image is magnified 40 times. The film is observed and if the image is clear, the moisture-curable silylated polycarbonate resin (ii) is considered "soluble" in the organic resin (i). When the image contains suspensions or droplets of the moisture-curable silylated polycarbonate resin (ii) within the organic resin (ii), then the moisture-curable silylated polycarbonate resin (ii) is considered insoluble in the organic resin (i).

Organic Resin (i).

The organic resin containing at least one functional group selected from the group consisting of carboxylic acid esters and/or ethers include organic compounds in which the main backbone of the compound contains carbon atoms and may contain the heteroatoms of oxygen, nitrogen or sulfur. The organic resin (i) may contain at least one other functional group selected from halo groups, amino groups, hydroxyl groups, carboxylic acid groups and/or cyano groups.

The organic resins (i) may contain a hydroxyl functional group. The hydroxyl functional group on the organic resin (i) may react with the alkoxysilyl group on the moisture-curable silylated polycarbonate resin (ii). The reaction between the organic resin (i) and the moisture-curable silylated polycarbonate resin (ii) may result in an increase in viscosity. The increase in viscosity may change the rheology properties of the resin composition over time (aging).

In one embodiment of the invention, the organic resin (i) has a hydroxyl number of about from 0 to 10, preferably about from 0 to 5, and even more preferably, about 0. In another embodiment of the invention, the hydroxyl number of the organic resin (i) can be determined in accordance with the procedures described in ASTM E222-10, Standard Test Methods for Hydroxyl Groups Using Acetic Anhydride Acetylation.

In one embodiment of the invention, the organic resins (i) are selected from the group consisting of acrylic resins, acrylate-containing resins, epoxy resins, melamine resins, alkyd resins, polyester resins, vinyl ether resins, vinyl acetate resins and/or cellulose acetate butyrate resins.

In one embodiment of the invention, the organic resin (i) is an acrylate resin in which the resin is a polymer based on methyl (meth)acrylate monomers. The methyl (meth)acrylate polymer may be either a homopolymer, that is, poly (methyl (meth)acrylate), or a copolymer, that is, methyl (meth)acrylate copolymerized with one or more copolymerizable monomers, such as alkyl acrylates, alkyl methacrylates, copolymerizable unsaturated carboxylic acids, and other suitable copolymerizable ethylenically unsaturated monomers. The methyl (meth)acrylate polymer can be either a homopolymer or a copolymer containing up to about 50 percent by weight of said polymer, of at least one copolymerized alkyl acrylate and/or alkyl methacrylate monomer, preferably, alkyl acrylates containing from 4 to 16 carbon atoms such as methyl acrylate, ethyl acrylate, isopropyl acrylate, n-butyl acrylate, isobutyl acrylate, namyl acrylate, isoamyl acrylate, decyl acrylate, 2-ethyl hexyl acrylate, dodecyl acrylate, or substituted alkyl acrylates having halogen atoms, preferably chlorine or fluorine, on the alpha carbon atom and/or alkyl methacrylates containing from 5 to 16 carbon atoms such as ethyl methacrylate, propyl methacrylate, n-butyl methacrylate, isobutyl methacrylate, n-amyl methacrylate, n-hexyl methacrylate, n-heptyl methacrylate, n-octyl methacrylate, 2-ethylhexyl methacrylate, decyl methacrylate, dodecyl methacrylate, 3-triethoxysilylpropyl methacrylate or 3-trimethoxysilylpropyl methacrylate, and/or up to one percent of a copolymerizable unsaturated carboxylic acid such as methacrylic acid, acrylic acid, maleic acid, itaconic acid, crotonic acid, cinnamic acid and/or up to 10 percent of other suitable copolymerizable monomers such as acrylonitrile, vinyltrimethoxysilane, vinyltriethoxysilane, vinyl acetate, vinyl chloride, vinyl fluoride, vinylidene chloride, or vinylidene fluoride. The alkyl methacrylates that may be copolymerized with the methyl (meth)acrylate have an alkyl group having from 2 to 12 carbon atoms. The alkyl acrylates have an alkyl group of from 1 to 13 carbon atoms.

A preferred copolymer includes copolymers containing about 47 to 84.5 percent, by weight, methyl methacrylate, up to about 50 percent by weight, copolymerized ethyl acrylate, n-butyl methacrylate or 2-ethylhexyl acrylate, and from about 0.5 to 3 percent by weight, copolymerized methacrylic acid.

When a methyl methacrylate copolymer is desired, selection of the copolymerizable monomer, and the amount thereof to be incorporated can provide end-use properties. Different copolymerized monomers impart different properties to the polymer, and thus polymers may be easily tailored to meet various requirements. The copolymerized monomers in the methyl methacrylate polymer usually tends to limit the outdoor durability of the resulting formulated resin compositions.

The methyl methacrylate polymer should have an inherent viscosity of from about 0.15 to 0.6 as determined at 20° C. in chloroform solution at a concentration of 0.5 gram of said polymer per deciliter, according to the method described by Billmeyer in Textbook of Polymer Chemistry, Interscience Publishing Inc., p. 128 (1957). It is impractical to prepare a methyl methacrylate polymer having an inherent viscosity of less than about 0.15. If the inherent viscosity is greater than about 0.6, the absolute viscosity of the resulting polymer-in-monomer solution can be too high to be of practical value. More preferred are methyl methacrylate polymers having inherent viscosities of from about 0.2 to 0.4.

A solution of methyl (meth)acrylate polymer in methyl (meth)acrylate monomer may contain from 1 to 9 parts by weight of the monomer per part by weight of the polymer. If less than 1 part of monomer per part of polymer is used, the resulting solution may have an undesirably high viscosity. If more than 9 parts of monomer per part of polymer is used, the curing rate may be undesirably slow. Moreover, when more than about 9 parts of monomer per part of polymer is used, hold-out over porous substrates may be inadequate, and an undesirable degree of shrinkage during hardening can occur, preventing the application of smooth finished coatings. Specifically, the solution may contain from 1.5 to 4 parts by weight of monomer per part by weight of polymer.

Other monomers which will copolymerize with the methyl (meth)acrylate under the conditions selected for curing the polymer-in-monomer solutions, may be added. Such monomers include the alkyl acrylates, alkyl methacrylates, carboxylic acids, and other copolymerizable ethylenically unsaturated monomers, as defined and described above, regarding the monomers which may be copolymerized in the methyl (meth)acrylate polymer. The amount of such additional monomers, if any, should not exceed one percent, based on the weight of the methyl (meth)acrylate monomer, when alkyl acrylates and/or alkyl methacrylates are used, or 10 percent where copolymerizable unsaturated carboxylic acids are used, or 40 percent where other suitable monomers such as acrylonitrile, vinyl acetate, vinyl chloride, vinyl fluoride, vinylidene chloride, vinylidene fluoride are used. Specifically, the monomer should be at least than 50 percent by weight of the methyl (meth)acrylate.

The acrylic resin may contain from 3 to 20 percent, based on the weight of monomer, of a polymerizable (meth)acrylate compound containing at least three (meth)acrylate ester groups. The compound containing at least three (meth)acrylate ester groups may function as crosslinking agents, copolymerizing with the methyl (meth)acrylate.

Suitable (meth)acrylate compounds containing at least three (meth)acrylate ester groups include trimethylolpropane trimethacrylate, glycerol trimethacrylate, pentaerythrytol trimethacrylate, butanetriol trimethacrylate, pentanetriol trimethacrylate, 2-(hydroxymethyl) 2-methylpropanetriol trimethacrylate, 3-(2-hydroxyethyoxy)propanediol trimethacrylate, 4-methyl-1,2,4-pentanetriol trimethacrylate, pentaerythrytol tetramethacrylate, 2 (hydroxymethyl)-1,2,3-propanetriol tetramethacrylate, threitol tetramethacrylate, diglycerol tetramethacrylate, glucose pentamethacrylate, adonitol pentamethacrylate, arabitol pentamethacrylate, xylitol pentamethacrylate, phamnitol pentamethacrylate, and the like. Specifically, glycerol trimethacrylate, pentaerythrytol trimethacrylate, pentaerythrytol tetramethacrylate, glucose pentamethacrylate, and more specifically, trimethylolpropane trimethacrylate are methacrylate compounds having at least three methacrylate groups. In addition to the required amount of polymerizable methacrylate compound having at least three methacrylate groups, small amounts of dimethacrylate compounds such as ethylene dimethacrylate, or diethylene dimethacrylate may be added if desired.

In another embodiment of the invention, the organic resin (i) is an acrylate-containing resin. The acrylate-containing resin may contain at least 2% of a polyfunctional (meth) acrylate and may contain up to 100% of said polyfunctional (meth)acrylate.

Aliphatic, monoethylenically unsaturated monomers may be added to the polyfunctional (meth)acrylate. The aliphatic, monoethylenically unsaturated monomers include vinyl nitriles, such as for example, acrylonitrile and methacrylonitrile; vinyl amides, such as acrylamide and methacrylamide; vinyl esters, such as vinyl chloride, vinyl acetate, vinyl propionate, vinyl butyrate and vinyl laurate; vinyl ketones such as vinyl methyl ketone, vinyl ethyl ketone, vinyl isopropyl ketone, vinyl n-butyl ketone, vinyl hexyl ketone, vinyl octyl ketone and methyl isopropenyl ketone; vinyl ethers such as vinyl methyl ether, vinyl ethyl ether, vinyl propyl ether and vinyl isobutyl ether; vinylidene compounds such as vinylidene chloride, vinylidene bromide and vinylidene bromochloride; esters of acrylic acid such as the methyl acrylate, ethyl acrylate, 2-chloroethyl acrylate, propyl acrylate, isopropyl acrylate, n-butyl acrylate, isobutyl acrylate, t-butyl acrylate, see-butyl acrylate, amyl acrylate, hexyl acrylate, glycidyl acrylate, ethoxyethyl acrylate, cyclohexyl acrylate, octyl acrylate, 2-ethylhexyl acrylate, decyl acrylate, dodecyl acrylate, hexadecyl acrylate and octadecyl acrylate; esters of methacrylic acid, such as methyl methacrylate, ethyl methacrylate, 2-chloroethyl methacrylate, propyl methacrylate, isopropyl methacrylate, n-butyl methacrylate, isobutyl methacrylate, t-butyl methacrylate, see-butyl methacrylate, amyl methacrylate, hexyl methacrylate, glycidyl methacrylate, ethoxyethyl methacrylate, cyclohexyl methacrylate, octyl methacrylate, 2-ethylhexyl methacrylate, decyl methacrylate, dodecyl methacrylate, hexadecyl methacrylate and octadecyl methacrylate; hydroxyalkyl methacrylates, such as hydroxyethyl methacrylate and hydroxypropyl methacrylate; hydroxyalkyl acrylates, such as hydroxyethyl acrylate and hydroxypropyl acrylate; unsaturated dicarboxylic acid esters, such as dimethyl itaconic acid ester, diethylcitraconic acid ester, di-n-propyl aconitic acid ester, diethyl fumaric acid ester, and diethyl maleic acid ester; substituted acrylamides, such as N-monoalkyl, N,N-dialkyl- and N-dialkylaminoalkyl acrylamides or methacrylamides where the alkyl groups may have from one to eighteen carbon atoms, such as methyl, ethyl, isopropyl, butyl, hexyl, cyclohexyl, octyl, dodecyl, hexadecyl and octadecyl; aminoalkyl esters of acrylic, such as 2-dimethylaminoethyl acrylate, 2-diethylaminoethyl acrylate and 6-dimethylaminohexyl acrylate; aminoalkyl esters of methacrylic, such as 2-dimethylaminoethyl methacrylate, 2-diethylaminoethyl methylacrylate and 6-dimethylaminohexyl methacrylate; alkylthioethyl methacrylates such as ethylthioethyl methacrylate; alkylthioethyl acrylates such as ethylthioethyl acrylate; vinylpyridines, such as 2-vinylpyridine, 4-vinylpyridine, and 2-methyl-5-vinylpyridine. Difunctional (meth)acrylate, such as ethylene glycol di(meth)acrylate or trimethylolpropane di(meth)acrylate may be added to the polyfunctional meth)acrylate in an amount up to 25 percent by weight, more specifically from 10 to 15 percent by weight, based on the weight of the polyfunctional (meth)acrylate.

In one embodiment of the invention, the acrylic resin has the general formula (V):

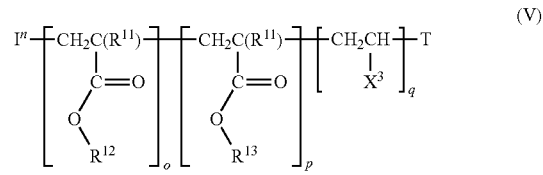

wherein
each $R^{11}$ is independently hydrogen or methyl;
each $R^{12}$ is independently methyl or ethyl;
each $R^{13}$ is independently selected from the group consisting of straight chain alkyl containing from 3 to 20 carbon atoms, branched chain alkyl containing from 3 to 20 carbon atoms, cycloalkyl containing from 6 to 12 carbon atoms, aryl containing from 6 to 10 carbon atoms, aralkyl containing from 7 to 12 carbon atoms, trimethoxysilyl substituted alkyl groups, triethoxysilylalkyl groups and hydroxyl substituted alkyl groups containing from 3 to 20 carbon atoms, more specifically an straight chain alkyl group containing from 3 to 6 carbon atoms, a branched chain alkyl containing from 3 to 8 carbon atoms or a hydroxyl-substituted straight chain alkyl containing 3 to 6 carbon atoms;

I" is an initiator decomposition moiety, more specifically the initiator group is selected from the group consisting of $R^{14}O-$, $R^{15}C(=O)O-$, $R^{16}$, where each $R^{14}$, $R^{15}$ and $R^{16}$ is hydrogen, an alkyl group of from 1 to 16 carbon atoms, a cycloalkyl group of from 6 to 10 carbon atoms, an aryl group of from 6 to 12 carbon atoms, an aralkyl group of from 7 to 12 carbon atoms or a cyano-substituted alkyl of from 1 to 6 carbon atoms;

T is a terminal group, more specifically hydrogen, $CH_2=CH-$, $R^{14}O-$, $R^{15}C(=O)O-$, $R^{16}$ or $R^{17}S-$, where each $R^{14}$, $R^{15}$, $R^{16}$ and $R^{17}$ is hydrogen, an alkyl group of from 1 to 16 carbon atoms, a cycloalkyl group of form 6 to 10 carbon atoms, an aryl group of from 6 to 12 carbon atoms or an aralkyl group of from 7 to 12 carbon atoms;

each $X^3$ is selected from the group consisting of $R^{18}O-$, $R^{19}C(=O)O-$, $Cl-$, $-C\equiv N$, trimethoxysilyl, triethoxysilyl and phenyl, where $R^{18}$ is an alkyl group of from 1 to 16 carbon atoms, a cycloalkyl group of form 6 to 10 carbon atoms, an aryl group of from 6 to 12 carbon atoms, an aralkyl group of from 7 to 12 carbon atoms, $R^{19}$ is an alkyl group of from 1 to 16 carbon atoms, a cycloalkyl group of form 6 to 10 carbon atoms, an aryl group of from 6 to 12 carbon atoms, an aralkyl group of from 7 to 12 carbon atoms, more specifically methyl, ethyl or propyl; and the subscripts o, p and q are integers where o is from 5 to 300, p is from 0 to 300, q is from 0 to 300, more specifically, o is from 15 to 250, p is from 5 to 250 and q is 0.

In another embodiment of the invention, the acrylic resin has a number average molecular weight of from about 1000 to 30,000, preferably, from about 5,000 to 25,000 and more preferably from about 8,000 to 15,000, where the number average molecular weight is determined in accordance with the procedures of ASTM D5296-11, Standard Test method for Molecular Weight Averages and Molecular Weight Distribution of Polystyrene by High Performance Size-Exclusion Chromatography.

Suitable organic resins (i) may further include functional groups making these organic resins (i) UV-curable compounds, such as compounds containing acryloxy, methacryloxy, acrylamido, methacrylamido and/or epoxy groups.

The organic resins (i) may contain both cationic and free radical UV curable functionality such as acrylated epoxides. Representative and non-limiting examples include glycidylmethacrylates or bisphenol A-based acrylated epoxides, such as the commercial products Sartomer CN104, CN120 and CN125.

The organic resin (i) may be ethylenically unsaturated urethanes. Ethylenically unsaturated urethanes may be prepared, for example, by reacting polyols such as simple diols, triols and higher hydric alcohols, polyester polyols, polyether polyols, acryl polyols, epoxypolyols or urethane polyols with polyisocyanates containing ethylenic unsaturation; by reacting the isocyanate groups of urethane resins with unsaturated compounds having active hydrogen atoms such as polymerizable unsaturated carboxylic acids, alcohols, or amines; by reacting hydroxyl groups of urethane polyols with unsaturated carboxylic acids or anhydrides thereof; and by reacting carboxyl groups of urethane resins with ethylenically unsaturated epoxides. For example ethylenically unsaturated urethanes may be prepared from the reaction of an isocyanate with a hydroxyalkyl(meth)acrylate. Illustrative isocyanates include 1,4-tetramethylene diisocyanate, 1,6-hexamethylene diisocyanate, 2,2,4-trimethyl-1,6-diisocyanato hexane, 1,10-decamethylene diisocyanate, 1,4-cyclohexylene diisocyanate, 4,4'-methylene bis(isocyanato cyclohexane), p-phenylene diisocyanate, isophorone diisocyanate, 4,4'-bisphenylene diisocyanate, 4,4'-methylene bis(diphenyl isocyanate), 1,5-naphthalene diisocyanate and 1,5-tetrahydronaphthalene diisocyanate. Examples of hydroxyalkyl acrylates which can be reacted with the isocyanate include 2-hydroxyethyl(meth)acrylate, 2-hydroxypropyl(meth)acrylate, 3-hydroxypropyl(meth) acrylate, trimethylolpropane mono- and di(meth)acrylate and any of the aforedescribed (meth)acrylates which has been modified by reaction with a lactone. Usually, equivalent amounts of the hydoxyalkyl(meth)acrylate and isocyanate are used. Still additional examples of ethylenically unsaturated urethanes include compounds derived from the reaction of a polyurethane having free isocyanato groups with a hydroxyalkyl(meth)acrylate or can be derived from the reaction of a polyurethane having free hydroxyl groups with (meth)acrylic acid. The resultant product is a polyurethane having free isocyanate or free hydroxyl groups depending on the relative amounts of reactants. Those polyurethanes having free isocyanate groups can be reacted with a hydroxyalkyl(meth)acrylate, as described above, while those polyurethanes having free hydroxyl groups can be reacted with (meth)acrylic acid.

Ethylenically unsaturated polyesters ordinarily are esterification products of ethylenically unsaturated carboxylic acids and polyhydric alcohols. Usually the ethylenic unsaturation is in the alpha,beta position with respect to the carbonyl groups. For example, ethylenically unsaturated polyesters can be derived from the reaction of a polycarboxylic acid with a polyhydric alcohol which is further reacted with an acrylic acid. Examples of polycarboxylic acids include: phthalic acid, isophthalic acid, terephthalic acid, trimellitic acid, tetrahydrophthalic acid, hexahydrophthalic acid, tetrachlorophthalic acid, adipic acid, azelaic acid, sebacic acid, succinic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid and itaconic acid. Anhydrides of the aforementioned acids, where they exist, are intended to be embraced by the term "acid." Examples of polyhydric alcohols include: ethylene glycol, propylene glycol, diethylene glycol, dipropylene glycol, butylene glycol, glycerol, trimethylolpropane, pentaerythritol, sorbitol, 1,6-hexanediol, 1,4-cyclohexanediol, 1,4-cyclohexanedimethanol, 1,2-bis(hydroxyethyl)cyclohexane, and 2,2-dimethyl-3-hydroxypropyl-2,2-dimethyl-3-hydroxypropionate.

Ethylenically unsaturated polyethers can be prepared by reacting a polyhydric alcohol such as ethylene glycol, polyethylene glycols, propylene glycol, polypropylene glycols, 1,4-butanediol, 1,6-hexanediol, neopentyl glycol, hydroxypivalic acid neopentyl glycol ester, trimethylolpropane, glycerol, and/or pentaerythritol, and the like with various amounts of ethylene oxide and/or propylene oxide and at least partially etherifying the free hydroxyl groups of the product with an ethylenically unsaturated alcohol such as allyl alcohol, methallyl alcohol, crotyl alcohol, or cinnamyl alcohol and/or esterifying the free hydroxyl groups of the aforesaid product with an alpha,beta-ethylenically unsaturated carboxylic acid such as (meth)acrylic acid, crotonic acid, and dicarboxylic acid half esters of monoalkanols, e.g., maleic, fumaric and itaconic half esters of monoalcohols containing 1 to 4 carbon atoms.

Ethylenically unsaturated epoxy resins may be prepared, for example, by reacting epoxy resins with unsaturated carboxylic acids or anhydrides. Examples of epoxy resins include compounds or mixtures of compounds containing more than one 1,2-epoxy group, i.e., polyepoxides. Examples of polyepoxides include the generally known polyglycidyl ethers of polyphenols and/or polyepoxides which are acrylic resins containing pendant and/or terminal 1,2-epoxy groups. Polyglycidyl ethers of polyphenols may be prepared, for example, by etherification of a polyphenol with epichlorohydrin or dichlorohydrin in the presence of an alkali. Examples of suitable polyphenols include: 1,1-bis(4-hydroxyphenyl)ethane, 2,2-bis(4-hydroxyphenyl)propane, 1,1-bis(4-hydroxyphenyl)isobutane, 2,2-bis(4-hydroxytertiarybutylphenyl)propane, bis(2-hydroxynaphthyl)methane, 1,5-dihydroxynaphthalene, 1,1-bis(4-hydroxy-3-allylphenyl)ethane, and the hydrogenated derivatives thereof. The polyglycidyl ethers of polyphenols of various molecular weights may be produced, for example, by varying the mole ratio of epichlorohydrin to polyphenol in known manner. Examples of epoxy resins also include: the polyglycidyl ethers of mononuclear polyhydric phenols such as the polyglycidyl ethers of resorcinol, pyrogallol, hydroquinone, and pyrocatechol, as well as the polyglycidyl ethers of polyhydric alcohols such as the reaction products of epichlorohydrin or dichlorohydrin with aliphatic and cycloaliphatic compounds containing from two to four hydroxyl groups such as the polyhydric alcohols set forth above in the description of ethylenically unsaturated polyesters. Examples of unsaturated carboxylic acids or anhydrides for reaction with the epoxy resins include: acrylic acid, methacrylic acid, 2-phenyl acrylic acid, alpha-chloroacrylic acid, and the like.

Ethylenically unsaturated acrylics may be prepared, for example, by reacting hydroxyl groups present in side chains of acrylic polymers with unsaturated mono- or polycarboxylic acids (or anhydrides) or with ethylenically unsaturated epoxides; or by reacting carboxyl groups present in side chains of acrylic polymers with ethylenically unsaturated epoxides.

In one embodiment, the organic resin (i) is an ethylenically unsaturated compound having the general formula (VI):

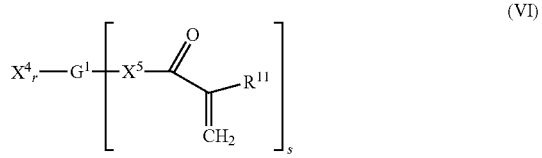

(VI)

wherein
each $R^{11}$ is independently hydrogen or methyl;
each $X^4$ is independently glycidoxy or 7-oxa-bicyclo[4.1.0]heptyl;
each $X^5$ is oxygen or —$NR^{20}$, where $R^{20}$ is hydrogen, an alkyl group of from 1 to 5 carbon atoms, cycloalkyl of from 6 to 8 carbon atoms, aryl group of from 6 to 12 carbon atoms or aralkyl of from 7 to 10 carbon atoms, more specifically oxygen;
$G^1$ is a polyvalent group selected from the group consisting of an alkyl group of from 2 to 20 carbon atoms, a cycloalkyl group of from 6 to 20 carbon atoms, an aryl group of from 6 to 20 carbon atoms, an aralkyl group of from 7 to 20 carbon atoms, or a polymeric group derived from a polyurethane, polyester or acrylic polymer;
The subscripts r and s are integers, where r is from 0 to 6, preferably from 0 to 2 and more preferably 0, and s is from 2 to 6, preferably 2, 3 or 4.

In another embodiment of the invention, the ethylenically unsaturated compound has a number average molecular weight of from about 170 to 30.000, preferably from about 200 to 10,000 and more preferably from about 200 to 1,000, where the number average molecular weight is determined in accordance with the procedures of ASTM D5296-11, Standard Test method for Molecular Weight Averages and Molecular Weight Distribution of Polystyrene by High Performance Size-Exclusion Chromatography.

The organic resins (i) may be epoxy-containing compounds. Epoxy resins useful in the compositions of the present disclosure include those derived from epoxy-functionalized monomers such as monomers containing one or more monofunctional or multifunctional glycidyl ethers.

The one or more epoxy resin(s) can be any epoxy resin which can be cured by an amine terminated polyamine curing agent. Generally, the epoxy resin can be any curable epoxy resin having a 1,2-epoxy equivalency greater than 1 and preferably, on the average, more than 1.5 epoxide groups per molecule. The epoxy resin can be saturated or unsaturated, linear or branched, aliphatic, cycloaliphatic, aromatic or heterocyclic, and may bear substituents which do not materially interfere with the curing reaction. Such substituents can include bromine. The epoxy resin may be monomeric or polymeric, liquid or solid, but is preferably liquid at room temperature. Suitable epoxy resins include glycidyl ethers prepared by reacting epichlorohydrin with a compound containing at least one, preferably two or more, hydroxyl groups, carried out under alkaline reaction conditions. Examples of epoxy resins suitable for use in the invention include polyglycidyl ethers of polyhydric phenols, epoxy novolacs or similar glycidated polyphenolic resins, polyglycidyl ethers of glycols or polyglycols, and polyglycidyl esters of polycarboxylic acids.

Specific epoxy resin(s) may include resins based on a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl) propane (bisphenol-A); 2,2-bis(4-hydroxy-3-tert-butylphenylpropane; 1,1-bis(4-hydroxyphenyl)ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable polyhydric phenols can also be obtained from the reaction of phenol with aldehydes such as formaldehyde (bisphenol-F). Fusion products of these polyglycidyl ethers of polyhydric phenols with phenolic compounds such as bisphenol-A are also suitable as epoxy resins, such as those described in U.S. Pat. Nos. 3,477,990 and 4,734,468. Commercial examples of preferred epoxy resins include, for example, EPON™ Resin 862, EPON™ Resin 828, EPON™ Resin 826, EPON™ Resin 825 EPON™ Resin 1001, EPON™ Resin 155 and epoxy resins sold under the tradename, EOI-REZ™, each available from Hexion, Inc.

Additional epoxy resins that can be used include mono- or polyglycidyl ethers of aliphatic or cycloaliphatic alcohols and polyalcohols and phenols. Aliphatic glycidyl ethers can be produced, for example, by reacting an epihalohydrin with an aliphatic diol (optionally containing ether linkages or sulfone linkages) in the presence of a Lewis acid catalyst followed by conversion of the halohydrin intermediate to the glycidyl ether by reaction with sodium hydroxide. Aromatic glycidyl ethers can be produced, for example, by reacting an epihalohydrin with a monohydric phenol in the presence of an alkali.

The epoxy resin compositions may include reactive modifiers. The reactive modifiers include epoxy functional alcohols, diols, polyols and acids that may be used to customize epoxy resins. The epoxy reactive modifiers may reduce the viscosity and surface tension for improved handling or may modify performance characteristics such as strength, adhesion and flexibility. As epoxy functional materials, the epoxy reactive modifiers react during cure, thereby becoming permanently bonded into the polymer network.

Commercial examples of epoxy resins include, for example, HELOX™ Modifier 68 (the diglycidyl ether of neopentyl glycol), HELOXY™ Modifier 107 (the diglycidyl ether of 1,4-cyclohexanedimethanol), HELOXY™ Modifier 61 (a butyl glycidyl ether), HELOXY™ Modifier 62 (a cresyl glycidyl ether) and HELOXY™ Modifier 9 (alkyl C.sub.12-C.sub.13 glycidyl ethers), each available from Hexion Inc Representative and non-limiting examples of suitable aliphatic glycidyl ethers include, for example, diglycidyl ethers of 1,4 butanediol, neopentyl glycol, cyclohexanedimethanol, hexanediol, hydrogenated bisphenol A, and polypropylene glycol; triglycidyl ethers of trimethylolethane and trimethylolpropane and caster oil glycidyl ether.

Glycidyl esters of aliphatic, cycloakiphatic and aromatic acids may be used. The glycidyl esters can be produced, for example, by reacting the aliphatic, cycloaliphatic or aromatic acids with epichlorohydrin and alkali metal hydroxides. Commercial examples include HELOXY™ Modifier 10 (glycidyl ester of neodecanoic acid), HELOXY™ Modifier 71 (dimer acid diglycidyl ester) and EPON™ Resin A-100 (diglycidyl ester of hexahydrophthalate anhydride), each available from Hexion, Inc.

Typical epoxy resins include glycidyl ethers of dihydric arenes, aliphatic diols or cycloaliphatic diols. Glycidyl ethers of aliphatic diols include linear or branched polymeric epoxides having one or more terminal epoxy groups such as, e.g., diglycidyl ethers of polyoxyalkylene glycols. Examples of aromatic glycidyl ethers include, but are not limited to, those that can be prepared by reacting a dihydric arene with an excess of epichlorohydrin. Dihydric arenes, as referred to herein, are arenes having two hydrogen atoms available for a reaction with epichlorhydrin. Examples of useful dihydric arenes include resorcinol, catechol, hydroquinone, and the polynuclear phenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmcthylmethane, dihydroxydiphenyldicyclohexylmethane, and dihydroxydiphenylcyclohexane.

Preferred epoxy resins include those having one or more repeating units derivable from bisphenol A, bisphenol F or both. Other preferred examples of epoxy resins include those that can be prepared by bisphenol A, bisphenol F or both with epichlorohydrine. The epoxy resins may have a molecular weight in the range of from about 170 to about 10,000, preferably from about 200 to about 3,000 g/mol. The average epoxy functionality in the resin should be greater than 1 and less than 4. Novolak-type resins may also be employed.

Examples of commercially available aromatic and aliphatic epoxides useful in the invention include diglycidylether of bisphenol A (e.g. available under the tradename EPON 828, EPON 1001, EPON 1310 and EPON 1510 from Hexion Specialty Chemicals GmbH, Rosbach, Germany, and DER-331, DER-332, and DER-334 available from Dow Chemical Co.); diglycidyl ether of bisphenol F (e.g. EPICLON 830) available from Dainippon Ink and Chemicals, Inc.); and flame retardant epoxy resins (e.g. DER 580, a brominated bisphenol type epoxy resin available from Dow Chemical Co.).

In one embodiment, the epoxy containing compounds have the general formula (VII):

$$G^3\text{-}(X^4)_t \qquad (VII)$$

where $G^3$ is a polyvalent group selected from the group consisting of a straight chain alkyl of from 2 to 18 carbon atoms, a branched chain alkyl containing from 3 to 18 carbon atoms, a cycloalkyl containing from 6 to 18 carbon atoms, an aryl containing from 6 to 18 carbon atoms or an aralkyl containing from 7 to 18 carbon atoms, an alkyl containing at least one oxa, oxo or halo group and from 4 to 18 carbon atoms, an aryl containing at least one oxa, oxo or halo group and from 4 to 18 carbon atoms;

each $X^4$ is independently glycidoxy or 7-oxa-bicyclo [4.1.0]heptyl; and the subscript t is an integer, where t is from 2 to 6, more specifically 2, 3 or 4.

In another embodiment of the invention, the epoxy-containing compound has a number average molecular weight of from about 170 to 30,000, preferably from about 200 to 10,000 and more preferably from about 200 to 1,000, where the number average molecular weight is determined in accordance with the procedures of ASTM D5296-11, Standard Test method for Molecular Weight Averages and Molecular Weight Distribution of Polystyrene by High Performance Size-Exclusion Chromatography.

The organic resins (i) may be fluoroethylene vinyl ether (FEVE) resins. FEVE resins are amorphous A-B type copolymers with repeating units of fluoroethylene and substituted vinyl ether. FEVE resins are soluble in solvent due to the vinyl ether groups. Solvent solubility makes the FEVE resins suitable for high-performance resin coatings. FEVE resins have characteristics of both fluoropolymers and hydrocarbons.

The vinyl ether groups make FEVE polymers suitable as resins for paint. Without the vinyl ether groups, these resins would not be soluble in solvent. This solubility is what allows FEVE resins to be used in a wide array of coating formulations that can be applied in factory or field settings. The vinyl ether groups also contribute to high gloss and allow for functional groups, like hydroxyl, to be incorporated into the structure.

In an embodiment of the invention, the FEVE resins have the general structure of formula (VIII):

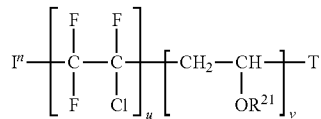
(VIII)

wherein
- I″ is an initiator decomposition moiety, preferably the initiator group is selected from the group consisting of $R^{14}O-$, $R^{15}C(=O)O-$, $R^{16}$, where each $R^{14}$, $R^{15}$ and $R^{16}$ is hydrogen, an alkyl group of from 1 to 16 carbon atoms, a cycloalkyl group of form 6 to 10 carbon atoms, an aryl group of from 6 to 12 carbon atoms, an aralkyl group of from 7 to 12 carbon atoms or a cyano-substituted alkyl of from 1 to 6 carbon atoms;
- T is a terminal group, preferably hydrogen, $CH_2=CH-$, $R^{14}O-$, $R^{15}C(=O)O-$, $R^{16}$ or $R^{17}S-$, where each $R^{14}$, $R^{15}$, $R^{16}$ and $R^{17}$ is hydrogen, an alkyl group of from 1 to 16 carbon atoms, a cycloalkyl group of form 6 to 10 carbon atoms, an aryl group of from 6 to 12 carbon atoms or an aralkyl group of from 7 to 12 carbon atoms;
- each $R^{21}$ is an alkyl group of from 1 to 16 carbon atoms, a cycloalkyl group of from 6 to 10 carbon atoms, an aryl group of from 6 to 12 carbon atoms, an aralkyl group of from 7 to 12 carbon atoms, $R^{19}$ is an alkyl group of from 1 to 16 carbon atoms, a cycloalkyl group of from 6 to 10 carbon atoms, an aryl group of from 6 to 12 carbon atoms or an aralkyl group of from 7 to 12 carbon atoms, preferably methyl, ethyl or propyl; and
- the subscripts u and v are integers, where u is from about 5 to 100; preferably, u is from about 10 to 50 and v is from 5 to 100, more preferably v is from about 10 to 50.

The organic resins (i) may be amino resins. The amino resins can be resins formed from the reaction of —NH containing compounds, formaldehydes or alcohols. Preferably, the amino resins are derived from 2,4,6-triamino-1,3,5-triazine, benzoguanamine, urea, glycoluril or poly(meth)acrylamide. Amino resins may have the chemical Formulae (IX), (X) or (XI):

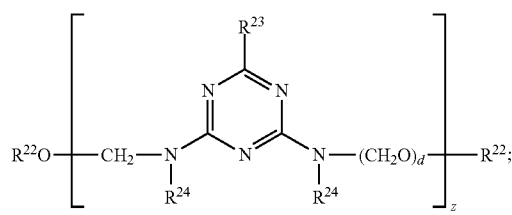
(IX)

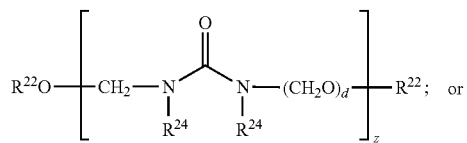
(X)

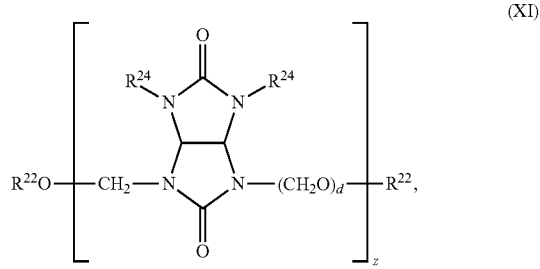
(XI)

wherein
- each $R^{22}$ is independently an alkyl group having from 1 to 10 carbon atoms, a cycloalkyl group having from 3 to 10 carbon atoms, an alkenyl group having from 2 to 10 carbon atoms, an aryl group having from 6 to 12 carbon atoms or an aralkyl group having from 7 to 12 carbon atoms, preferably an alkyl group having from 1 to 3 carbon atoms and more preferably methyl;
- each $R^{23}$ is independently phenyl, $-N(CH_2OR^{22})_2$ or $-NH(CH_2OR^2)$;
- each $R^{24}$ is independently hydrogen or $-CH_2OR^2$; and
- each d and z is an integer, where d is 0 or 1, preferably 1, and z is from about 1 to 40, preferably about 1 to 15, more preferably, 1 to 3.

In one embodiment of the invention, $R^{22}$ is an alkyl group of from 1 to 5 carbon atoms, each $R^{23}$ and $R^{24}$ is independently $-N(CH_2OR^{22})_2$, d is 1 and z is 1 to 3.

Representative and non-limiting examples of the amino resins, also known as aminoplast resins, are 1,1,3,3-tetra-methoxymethylurea, 1,3,3-tris-methoxymethylurea, 1,3-bis-methoxymethylurea, 1,1-bis-methoxymethylurea, 1,1,3,3-tetra-ethoxymethylurea, 1,3,3-tris-ethoxymethylurea, 1,3-bis-ethoxymethylurea, 1,1-bis-ethoxymethylurea, 1,1,3,3-tetra-propoxymethylurea, 1,3,3-tris-propoxymethylurea, 1,3-bis-propoxymethylurea, 1,1-bis-propoxymethylurea, 1,1,3,3-tetra-butoxymethylurea, 1,1,3,3-tetra-phenoxymethylurea, N-(1,3,3-tris-ethoxymethylureidomethyl)-1,1,3,3-tetra-ethoxymethylurea, N, N'-bis-(1,1,3-tris-ethoxymethylureidomethyl)-1,3-bis-ethoxymethylurea, N, N'-bis-(1,1,3-tris-ethoxymethylureido-methoxymethyl)-1,3-bis-ethoxymethylurea, N,N,N',N',N'',N''-hexakis-methoxymethyl-[1,3,5]triazine-2,4,6-triamine, N,N,N',N', N"-pentakis-methoxymethyl-[1,3,5]triazine-2,4,6-triamine, N,N,N',N"-tetrakis-methoxymethyl-[1,3,5]triazine-2,4,6-triamine, N,N,N',N',N",N"-hexakis-ethoxymethyl-[1,3,5]triazine-2,4,6-triamine, N,N,N',N',N"-pentakis-ethoxymethyl-[1,3,5]triazine-2,4,6-triamine, N,N,N',N"-tetrakis-ethoxymethyl-[1,3,5]triazine-2,4,6-triamine, N,N,N',N',N", N"-hexakis-propoxymethyl-[1,3,5]triazine-2,4,6-triamine, N,N,N',N',N"-pentakis-propoxymethyl-[1,3,5]triazine-2,4,6-triamine, N,N,N',N"-tetrakis-propoxymethyl-[1,3,5]triazine-2,4,6-triamine, N,N,N',N',N",N"-hexakis-phenoxymethyl-[1,3,5]triazine-2,4,6-triamine, N,N,N',N',N"-pentakis-phenoxymethyl-[1,3,5]triazine-2,4,6-triamine, N,N,N',N"-tetrakis-phenoxymethyl-[1,3,5]triazine-2,4,6-triamine, 1,3,4,6-tetrakis-methoxymethyl-tetrahydro-imidazo[4,5-d]imidazole-2,5-dione, 1,3,4,6-tetrakis-ethoxymethyl-tetrahydro-imidazo[4,5-d]imidazole-2,5-dione, 1,3,4,6-tetrakis-propoxymethyl-tetrahydro-imidazo[4,5-d]imidazole-2,5-dione, 1,3,4,6-tetrakis-phenoxymethyl-tetrahydro-imidazo[4,5-d]imidazole-2,5-dione, 1,3,4-tris-ethoxymethyl-tetrahydro-imidazo[4,5-d]imidazole-2,5-dione,1,4-bis-ethoxymethyl-tetrahydro-imidazo[4,5-d]imidazole-2,5-dione, 1,3,4,-tris-methoxymethyl-tetrahydro-imidazo[4,5-d]imidazole-2,5-dione and 1,3,4,-tris-phenoxymethyl-tetrahydro-imidazo[4,5-d]imidazole-2,5-dione.

The aminoplast resins can be obtained commercially. For example, amino resins can be commercially purchased from INEOS Melamine GmbH under the tradenames, RESIMENE® 747 ULF, RESIMENE®755, RESIMENE®757, RESIMENE® 764, RESIMENE® CE 8824 ULF and MAPRENAL® UF 134/60B.

The organic resins (i) can be alkyd resins. Alkyd resins are polyester resins modified by the addition of fatty acids. The alkyd resins are derived from polyols, dicarboxylic acids carboxylic acid anhydrides.

Alkyd resins as characterized as long, medium and short. The terms represent the oil length in the resin. The alkyl resins may be modified with phenolic resins, styrene, vinyl toluene, acrylic monomers and polyurethanes. The polyurethane alkyds are provided for by reacting the residual hydroxyl groups with polyisocyanates.

Short alkyds are suitable as organic resins (i), in which the oil length is control by chain stopping with benzoic acid or para-tert-butylbenzoic acid.

Representative and non-limiting long oil alkyds include Karnakyd 3160 and 3276, medium alkyds include Karnakyd 2145 and short alkyds include Karnakyd 1170, 1370, 1270, 176, 276 and 4250, commercially available from Karna Paints Pvt. Ltd.

Moisture-Curable Silylated Polycarbonate Resin (ii).

The moisture-curable silylated polycarbonate resin (ii) has the general formula (I):

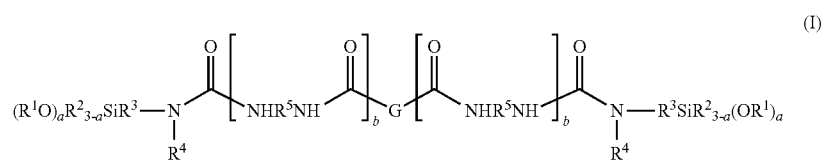

wherein:
G is a moiety of general structure (II):

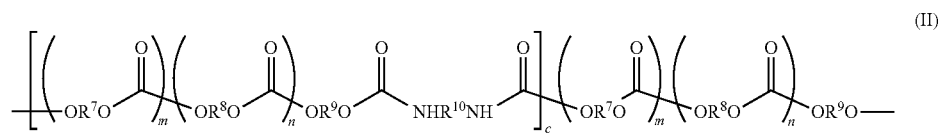

in which
   each $R^1$ is independently an alkyl group of from 1 to 6 carbon atoms;
   each $R^2$ is independently an alkyl group of from 1 to 4 carbon atoms or a phenyl group;
   each $R^3$ is independently an alkylene group of from 1 to 12 carbon atoms;
   each $R^4$ is independently an alkyl group of from 1 to 6 carbon atoms, a phenyl group, hydrogen or an $-R^3SiR^2_{3-a}(OR^1)_a$ group;
   each $R^5$ is independently a divalent organic group selected from the group consisting of an alkylene group having 1 to 16 carbon atoms, a cycloalkylene group having 5 to 16 carbon atoms or the group $X^1$ having the general formula (III):

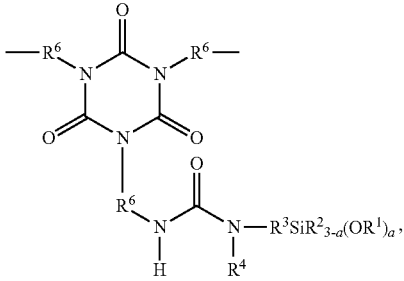

(III)

each $R^6$ is independently an alkylene group of from 1 to 12 carbon atoms or a cycloalkylene group of from 5 to 16 carbon atoms;
   each $R^7$ is an alkylene group of from 2 to 12 carbon atoms;
   each $R^8$ is an alkylene group of from 2 to 12 carbon atoms;
   each $R^9$ is independently $R^7$ or $R^8$;
   each $R^{10}$ is independently a divalent organic group selected from the group consisting of an alkylene group of from 1 to 12 carbon atoms, a cycloalkylene group of from 5 to 16 carbon atoms, $X^1$ or the group $X^2$ having the general formula (IV):

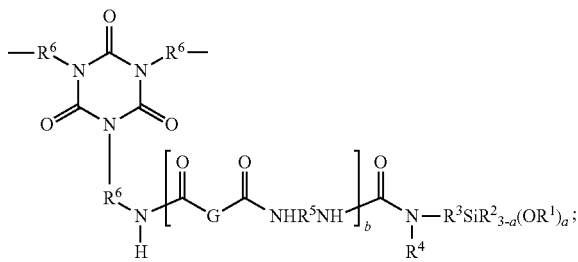

(IV)

and,
   subscripts a, b, c, m and n are integers wherein a is 1 to 3; b is 0 or 1; c is 0 to 5; m is 1 to 100; and, n is 0 to 100, with the provisos that when b is 0, $R^4$ is hydrogen; when n is 0, $R^7$ is a branched alkylene group of from 3 to 12 carbon atoms; and, when n is 1 to 100, $R^7$ and $R^8$ are different alkylene groups.

The moisture-curable silylated polycarbonate resin (ii) herein can impart especially desirable properties to resin compositions, which can be used in the preparation of coatings, sealants and adhesives. Due to their low crystallinity, these moisture-curable silylated polycarbonate resins (ii) are typically liquids at ambient temperatures, as for example, at from 18° to 25° C., and therefore do not require heating prior to use. Other advantages of moisture-curable silylated polycarbonate resins (ii) include their excellent flow and flattening characteristics, even in the absence of solvents.

Resin compositions containing the moisture-curable silylated polycarbonate resins (ii) may exhibit high levels of resistance to the effects of rapid deformation (impact) as well as exhibiting desirable adhesion. The resin compositions of the present invention, upon curing, also may exhibit excellent levels of flexibility and corrosion resistance and possess greater stability when exposed to ultraviolet (UV) radiation and greater resistance to air oxidation than resin composition which do not contain these moisture-curable silylated polycarbonate resins (ii).

In the case of adhesives, particularly those intended for adhering flexible layers or lamina to each other, the excellent flow properties of the resin compositions herein, even in the absence of viscosity-reducing agents such as solvents, make them especially desirable for incorporation in such products.

Methods of Formation of Moisture-Curable Silylated Polycarbonate Resins (ii).

Moisture-curable silylated polycarbonate resins (ii) of the present invention can be obtained by reacting at least one silylating agent with at least one of: polycarbonate diol (XII); hydroxyl-terminated polyurethane (XIII) derived from the reaction of organic polyisocyanate with an excess of polycarbonate diol (XIV); and, isocyanate-terminated polyurethane (XIV) derived from the reaction of an excess of an organic polyisocyanate with polycarbonate diol (XII).

Processes for the preparation of polycarbonate diol (XII), hydroxyl-terminated polyurethane (XIII) and isocyanate-terminated polyurethane (XIV) and processes for the silylation of diol (XII) and polyurethanes (XIII) and (XIV) are described herein below.

Polycarbonate Diol (XII)

Polycarbonate diol (XII) can be obtained by reacting at least one carbonylating agent with diol of which at least 80 mole percent, preferably at least 90 mole, more preferably at least 95 mole percent, and still more preferably 100 mole percent, with at least one of a mixture of at least two different acyclic straight chain aliphatic diols, each such diol possessing up to 12 carbon atoms, preferably 2 to 12 carbon atoms, and more preferably from 2 to 10 carbon atoms; at least one acyclic branched chain aliphatic diol possessing up to 12 carbon atoms, preferably 3 to 12 carbon atoms and more preferably from 3 to 10 carbon atoms; and, a mixture of at least one straight chain aliphatic diol possessing up to 12 carbon atoms, preferably 2 to 12 carbon atoms and more preferably from 2 to 10 carbon atoms, and at least one acyclic branched chain aliphatic diol possessing up to 12 carbon atoms, preferably 3 to 12 carbon atoms and more preferably from 3 to 10 carbon atoms.

Suitable carbonylating agents for reaction with the aforementioned polyol(s) to produce polycarbonate diol(s) (XII) include, but are not limited to, phosgene, triphosgene, [1,3,5]trioxane-2,4,6-trione, aliphatic and aromatic carbonates (carbonate esters) such as dialkyl carbonates, diarylcarbonates, alkylene carbonates, alkylaryl carbonates, and mixtures thereof. For example, the carbonate compound can be dimethyl carbonate, diethyl carbonate, di-n-butyl carbonate, diisobutyl carbonate, diphenyl carbonate, methylphenyl carbonate, ethylene carbonate, propylene carbonate, and mixtures thereof. Of these carbonylating agents, phosgene, dialkyl carbonates such as dimethyl carbonate and diethyl carbonate, and alkylene carbonates such as ethylene carbonate and propylene carbonate are generally preferred with phosgene being more preferred.

In one embodiment of the invention, at least two different acyclic straight chain aliphatic diols, each possessing from 2 to 12 carbon atoms, and preferably from 2 to 10 carbon atoms, are reacted with the selected carbonylating agent(s) to provide a mixture of copolycarbonate diols (XII). Among the suitable acyclic straight chain aliphatic diols that can be used for the preparation of a mixture of copolycarbonate diols (XII) are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, and the like. The proportions of acyclic straight chain aliphatic diols to each other can vary widely, e.g., from 20 to 80 mole percent, and preferably from 40 to 60 mole percent, of a first acyclic straight chain aliphatic diol with the balance being made up of second, third, etc., acyclic straight chain aliphatic diol(s).

With further regard to this embodiment of the invention, it is especially advantageous to employ a mixture of two or more different acyclic straight chain aliphatic diols in which at least one such diol possesses an even number of carbon atoms and at least one other such diol possess an odd number of carbon atoms. The diol(s) possessing an even number of carbon atoms can represent from 20 to 80 mole percent, and preferably, from 40 to 60 mole percent, of the diol mixture with the diol(s) possessing an odd number of carbon atoms making up the remainder of the diol mixture.

In accordance with this particular embodiment of the invention, some suitable diol mixtures include the following listed in Table 1:

TABLE 1

| Diol Mixture | Acyclic Straight Chain Aliphatic Diol(s) of Even Carbon Number, mole percent | Acyclic Straight Chain Aliphatic Diol(s) of Odd Carbon Number, mole percent |
| --- | --- | --- |
| A | ethylene glycol, 50 | 1,3-propanediol, 50 |
| B | ethylene glycol, 60 | 1,3-propanediol, 40 |
| C | ethylene glycol, 60 | 1,5-pentanediol, 40 |
| D | 1,4-butanediol, 40 | 1,3-propanediol, 60 |
| E | ethylene glycol, 30 1,4-butanediol, 20 | 1,5-pentanediol, 20 |
| F | 1,4-butanediol, 60 | 1,5-pentanediol, 40 |
| G | ethylene glycol, 50 | 1,7-heptanediol, 50 |
| H | 1,6-hexanediol, 50 | 1,5-pentanediol, 50 |
| I | 1,4-butanediol, 40 | 1,5-pentanediol, 30 1,7-heptanediol, 30 |
| J | 1,4-butanediol, 60 | 1,7-heptanediol, 40 |
| K | ethylene glycol, 35 1,4-butanediol, 40 | 1,5-heptanediol, 15 1,7-heptanediol, 15 |

In an embodiment of the invention, use of such mixtures of acyclic straight chain aliphatic diols in the preparation of polycarbonate diols (XII) has been found to reduce the crystallinity of the product copolycarbonate diols even further compared with the use of mixtures of acyclic straight chain copolycarbonate diols in which all, or nearly all, of the constituent diols have chain lengths having an even number of carbon atoms or conversely, an odd number of carbon atoms.

In another embodiment of the invention, at least one acyclic branched aliphatic diol possessing up to 12 carbon atoms, and preferably from 3 to 10 carbon atoms, is reacted with carbonylating agent(s) to provide the polycarbonate diol (XII). Suitable acyclic branched diols include, but are not limited to, 2-methyl-1,3-propanediol, 2-methy-1,4-butanediol, 2,3-dimethyl-1,4-butanediol, 2-methyl-1,5-pentanediol, 3-methyl-1,5-pentanediol, 2,2,4-trimethyl-1,6-hexanediol, 3,3,5-trimethyl-1,6-hexanediol, 2,3,5-trimethyl-1,6-pentanediol, 2-methyl-3-ethyl-1,5-pentanediol, 2-ethyl-3-propyl-1,5-pentanediol, 2,4-dimethyl-3-ethyl-1,5-pentanediol, 2-ethyl-4-methyl-3-propyl-1,5-pentanediol, 2,3-diethyl-4-methyl-1,5-pentanediol, 3-ethyl-2,2,4-trimethyl-1,5-pentanediol, 2,2-dimethyl-4-ethyl-3-propyl-1,5-pentanediol, 2-methyl-2-propyl-1,5-pentanediol, 2,4-dimethyl-3-ethyl-2-propyl-1,5-pentanediol, 2-butyl-2-ethyl-1,5-pentanediol, and 3-butyl-2-propyl-1,5-pentanediol and combinations thereof.

Of these acyclic branched aliphatic diols, 2-methyl-1,3-propanediol, 2-methyl-1,4-butanediol, 2,3-dimethyl-1,4-butanediol and 2-methyl-1,5-pentanediol and mixtures thereof are preferred for use in the preparation of polycarbonate diols (XII). Where mixtures of acyclic branched chain aliphatic diols are used, it can be advantageous to employ at least one such diol possessing an even number of carbon atoms and at least one such diol possessing an odd number of carbon atoms.

In yet another embodiment, polycarbonate diol (XII) and mixtures of such diols are obtained from the reaction of the selected carbonylating agent(s) with mixtures containing at least one acyclic straight chain diol and at least one acyclic branched chain aliphatic diol of the foregoing types. The proportions of acyclic straight chain aliphatic diol(s) and acyclic branched chain diol(s) can vary widely in these diol mixtures, such as for example, from 20 to 80 mole percent, and preferably from 40 to 60 weight percent, of the former with the latter making up the balance of the diol mixtures. Here it can also be advantageous to employ diol mixtures in the preparation of polycarbonate diols (XII) in which at least one constituent diol, such as for example, acyclic straight chain aliphatic diol, possesses an even number of carbon atoms and at least one other constituent diol, such as for example, acyclic branched chain aliphatic diol, possesses an odd number of carbon atoms or vice versa. Some suitable mixtures of acyclic straight chain aliphatic diol(s) and acyclic branched chain aliphatic diol(s) for preparation of polycarbonate diols (XII) include the following in Table 2:

TABLE 2

| Diol Mixture | Acyclic Straight Chain Aliphatic Diol(s), mole percent | Acyclic Branched Chain Aliphatic Diol(s), mole percent |
| --- | --- | --- |
| L | ethylene glycol, 50 | 2-methyl-1,4-butanediol, 50 |
| M | ethylene glycol, 50 | 2-methyl-1,4-butanediol, 50 |
| N | 1,3-propanediol, 50 | 2-methyl-1,3-propanediol, 50 |
| O | 1,4-butanediol, 65 | 2,3-dimethyl-1,4-butanediol, 35 |
| P | ethylene glycol, 30 1,3-propanediol 25 | 2-methyl-1,3-propanediol, 45 |
| Q | 1,4-butanediol, 60 | 2-methyl-1,5-pentanediol, 40 |
| R | 1,6-hexanediol, 60 | 3-methyl-1,5-pentanediol, 40 |
| S | ethylene glycol, 30 1,4-butanediol, 20 | 2-methyl-1,5-pentanediol, 30 2,4-dimethyl-3-ethyl-1,5-pentanediol, 20 |
| T | 1,4-butanediol, 50 1,6-hexanediol, 25 | 2-methyl-1,4-butanediol, 50 |

The reaction of diol(s) with carbonylating agent(s) can be carried out in accordance with known and conventional procedures to produce polycarbonate diol(s) (XII). As the reaction proceeds, by-product(s) of the reaction, such as HCl in the case of phosgene as carbonylating agent and alkanol(s) in the case of dialkyl carbonates as carbonylating agents, are advantageously removed from the reaction zone on a continuous basis. The amounts of diol(s) and carbonylating agent(s) may vary provided copolycarbonate diol(s) (XII) are obtained. Thus, for example, the mole ratio of total diol(s) to total carbonylating agent(s) can vary from 2.0:1.0 to 1.01:1.0 and preferably from 1.3:1.0 to 1.1:1.0. In an embodiment of the invention, it is generally preferred to employ a molar excess of diol(s) to carbonylating agent(s).

In some cases, it may be desirable to employ at least one catalyst for the reaction of carbonylating agent and diol to produce polycarbonate diol(s) (XII), e.g., a transesterification catalyst. Suitable transesterification catalysts include, but are not limited to, titanium compounds such as titanium tetrachloride and tetraalkoxytitaniums such as tetra-n-butoxy-titanium and tetraisopropoxytitanium; metallic tin and tin compounds such as tin(II)hydroxide, tin(II)chloride, dibutyltin laurate, dibutyltin oxide, and butyltin tris(ethylhexanoate). Of the aforementioned transesterification catalysts, it is preferred to employ one or more of tetra-n-butoxytitanium, tetraisopropoxytitanium, dibutyltin laurate, dibutyltin oxide and butyltin tris(ethylhexanoate). The catalyst will be present is the transesterification reaction medium in at least a transesterification catalyzing-effective amount, for example, in an amount of from 1 to 5,000 ppm, and preferably from 10 to 1,000 ppm, based on the weight of the diol reactant(s).

The reaction conditions employed for producing polycarbonate diol (XII) can vary widely, again, provided polycarbonate (XII) is obtained. For example, specific reaction conditions include heating the reaction mixture at a temperature of from 110 to 200° C. under ambient atmospheric pressure for 1 to 24 hours, then at a temperature of from 110 to 260° C., preferably 140 to 240° C. under reduced pressure for from 1 to 20 hours, and then under reduced pressure gradually taken down to 20 mmHg or less at 140 to 240° C. for 0.1 to 20 hours. The reactor is preferably provided with a means, e.g., a distillation column, to remove by-product(s) of the reaction as it/they are produced.

Polycarbonate diol (XII) can advantageously possess a number average molecular weight as measured in accordance with ASTM D5296-11, Standard Test method for Molecular Weight Averages and Molecular Weight Distribution of Polystyrene by High Performance Size-Exclusion Chromatography, of from 400 to 5,000, preferably from 500 to 4,000 and more preferably from 1500 to 3000, and a hydroxyl value (KOH mg/g) as measured in accordance with ASTM E222-10, Standard Test method for Hydroxyl Groups Using Acetic Anhydride Acetylation, of from 25 to 250 and preferably from 50 to 125.

One preferred polycarbonate diol is sold under the designation ETERNACOLL® PH200D, available from UBE. It has a molecular weight of about 2000 and an OH value of 51-61 KOH mg/PCD g. Preferred polycarbonate diols are believed to exhibit the following ratio:

$$CH_2CH_2CH_2CH_2CH_2CH_2OC(=O)—/—$$
$$CH_2CH_2CH_2CH_2CH_2OC(=O)O—$$

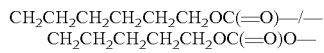

45 C-mol %/55 C-mole %

Hydroxyl-Terminated Polyurethane (XIH) and Isocyanate-Terminated Polyurethane (XIV)

Hydroxyl-terminated polyurethane (XIII) and isocyanate-terminated polyurethane (XIV) can be obtained by reacting at least one polycarbonate diol (XII) as described above with at least one organic polyisocyanate, in the absence or in the presence of a catalytically effective amount of catalyst for the urethane-forming reaction, under urethane-forming reaction conditions such as any of those well known in the art.

Suitable organic polyisocyanates may be represented by the formula (XV):

$$Q(NCO)_x \qquad (XV)$$

wherein x is 2 or 3, preferably 2, and more preferably a blend of polyisocyanates having at least one diisocyanate of structure (XV) where x is 2 and at least one triisocyanate of structure (XV) where x is 3, and Q is a x-valent organic group, preferably a divalent or trivalent hydrocarbon group such as an aliphatic or cycloaliphatic group containing from 1 to 30 carbon atoms, preferably from 6 to 24 carbon atoms, or a divalent or trivalent organic group derived from a hydrocarbon and containing at least one isocyanurate ring, at least one urethane group or at least one oxygen atom. The polyisocyanate containing a hydrocarbon and at least one urethane group can be prepared from the reaction of a diisocyanate or triisocyanate with a trihydroxyalkane of from 3 to 10 carbon atoms.

Suitable organic polyisocyanates for use in preparing hydroxyl-terminated polyurethane (XIII) and isocyanate-terminated polyurethane (XIV) include, but are not limited to, diisocyanates, triisocyanates, dimers, trimers and mixtures thereof. Specific examples of useful polyisocyanates include, but are not limited to, hydrogenated 4,4'-diphenylmethane diisocyanate, hexamethylene diisocyanate, isophorone diisocyanate, 4,4'-dicyclohexylmethane diisocyanate, 1,3,6-hexamethylene triisocyanate, 1,6,11-undecane triisocyanate, isophorone diisocyanate dimer, isophorone diisocyanate trimer, reaction product of isophorone diisocyanate with a triol, and the like, and mixtures thereof. Isophorone diisocyanate its dimers and trimers and mixtures thereof are preferred for use herein.

Suitable organic polyisocyanates for use in preparing hydroxyl-terminated polyurethane (XIII) and isocyanate-terminated polyurethane (XIV) include, but are not limited to, diisocyanates, triisocyanates, dimers, trimers and mixtures thereof. Specific examples of useful polyisocyanates include, but are not limited to, hydrogenated 4,4'-diphenylmethane diisocyanate, hexamethylene diisocyanate, isophorone diisocyanate, 4,4'-dicyclohexylmethane diisocyanate, 1,3,6-hexamethylene triisocyanate, 1,6,11-undecane triisocyanate, isophorone diisocyanate dimer, isophorone diisocyanate trimer, reaction product of isophorone diisocyanate with a triol, and the like, and mixtures thereof. Isophorone diisocyanate its dimers and trimers and mixtures thereof are preferred for use herein.

In one embodiment of the invention, the organic polyisocyanate (XV) is a mixture comprising an organic polyisocyanate containing two isocyanate groups and an organic polyisocyanate containing three isocyanate groups. The molar ratio of the organic polyisocyanate containing two isocyanate groups and organic polyisocyanate containing three isocyanate groups is from 10:1 to 1:10, preferably from 2:1 to 1:2, and more preferably 1.5:1 to 1:1.5.

The chain extension reaction can be carried out in various ways depending on the desired properties of the chain extended polycarbonate diol (XII). For example, while various suitable chain extension agents are described herein, polyisocyanates (XV) are well suited as chain extension agents. In one embodiment, where it is desired to have at least one chain extended polycarbonate diol (XII), the at least one chain extended polycarbonate diol (XII) can be produced by continuously mixing a molar excess of polycarbonate diol (XII) with the polyisocyanate (XV) to produce the hydroxyl-terminated polyurethane (XIII). A molar excess of polycarbonate diol (XII) in the chain extension reaction produces an OH:NCO molar ratio greater than 1:1. In more preferred embodiments, the OH:NCO molar ratio ranges from 1.1:1 to 10:1, even more preferably, from 1.5:1 to 3:1, and even more preferably from 1.8:1 to 2.2:1 to provide hydroxyl-terminated polyurethane (XIII).

In one embodiment of the invention, where it is desired to have a chain extended polycarbonate diol (XII) where the reactive functional groups are terminal isocyanate groups, the chain extended polycarbonate diol (XII) can be produced by continuously mixing a molar excess of polyisocyanate (XV) with the polycarbonate diol (XII) to provide isocyanate-terminated polyurethane (XIV).

A molar excess of polyisocyanate (XV) in the chain extension reaction produces an OH:NCO molar ratio less than 1:1. In more preferred embodiments the OH:NCO molar ratio ranges from 0.1:1 to 0.9:1, even more preferably, from 0.3:1 to 0.7:1, and even more preferably from 0.45:1 to 0.55:1 to provide isocyanate-terminated polyurethane (XIV).

Conditions for the polyurethane-forming reaction can include reaction temperatures of from 20 to 180° C. and preferably from 60 to 130° C., pressures of from 10 to 300 kilopascal, preferably from 0 to 150 kilopascal and more preferably 100 kilopascal, and reactions times of from 0.50 to 24 hours and preferably from to 8 hours.

The chain extension reaction can be carried out in the absence or presence of catalysts used for the urethane-forming reaction. Known and conventional catalysts for the urethane-forming reaction are contemplated. Suitable catalysts include metal and non-metal catalysts. Examples of the metal portion of the metal condensation catalysts useful in the present invention include tin, titanium, zirconium, lead, iron cobalt, antimony, manganese, bismuth and zinc compounds. Other suitable non-limiting examples of catalysts used for making the first or second intermediate product are well known in the art and include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as $MoO_2{++}$, $UO_2{++}$, and the like; alcoholates and phenolates of various metals such as $Ti(OR)_4$, $Sn(OR)_4$, $Sn(OR)_2$, $Al(OR)_3$, $Bi(OR)_3$ and the like, wherein R is alkyl or aryl of from 1 to 18 carbon atoms, and reaction products of alcoholates of various metals with carboxylic acids, beta-diketones, and 2-(N,N-dialkylamino) alkanols, such as well-known chelates of titanium obtained by this or equivalent procedures. Further catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltin dilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof. These catalysts are employed at from 0.001 to 5 weight percent, more specifically from 0.001 to 2 weight percent and even more specifically, from 0.005 to 1 weight percent, and even more preferably 0.005 to 0.1 weight percent, based on the weight of the polycarbonate diol (V). In one embodiment, the catalyst is 20 ppm Sn or 120 ppm of catalyst compound, e.g., dibutyltin dilaurate (DBTDL), relative to the polycarbonate diol (XII).

Moisture-Curable Silylated Polycarbonate Resin.

Silylation of polycarbonate diol (XII), hydroxyl-terminated polyurethane (XIII) and isocyanate-terminated polyurethane (XIV) described above can be carried out employing suitable silylating agent(s), preferably, at least 90 percent completion and more preferably to at least 95 percent completion.

Silylation of polycarbonate diol (XII), hydroxyl-terminated polyurethane (XIII) and mixtures thereof can be accomplished by reaction with an isocyanatosilane. Suitable isocyanatosilanes are those of the general formula (XVI):

(XVI)

wherein each $R^1$ is independently an alkyl group of from 1 to 6 carbon atoms and preferably from 1 to 3 carbon atoms, each $R^2$ is independently an alkyl group of from 1 to 4 carbon atoms or phenyl group, preferably from 1 to 3 carbon atoms, $R^3$ is a divalent alkylene group of from 1 to 12 carbon atoms, preferably of from 1 to 3 carbon atoms, and more preferably 3 carbon atoms, and a is an integer of from 1 to 3.

Examples of such isocyanatosilanes include, but are not limited to, 1-isocyanatomethyltrimethoxysilane, 2-isocyanatoethyltrimethoxysilane, 3-isocyanatopropyltrimethoxysilane, 1-isocyanatomethyltriethoxysilane, 2-isocyanatoethyltriethoxysilane, 3-isocyanatopropyltriethoxysilane, 1-isocyanatomethylmethyldimethoxysilane, 3-isocyanatopropylmethyldimethoxysilane, 1-isocyantomethylmethyldiethoxysilane, 3-isocyanatopropylmethyldiethoxysilane and their mixtures.

Silylation of isocyanate-terminated polyurethane (XIV) can be accomplished by reaction of isocyanate-terminated polyurethane (XIV) with at least one silane possessing at least one functionality that is reactive for isocyanate, e.g., primary amino, secondary amino or mercapto (sufhydryl). Advantageously, the silane is a primary or secondary aminosilane of the general formula (XVII):

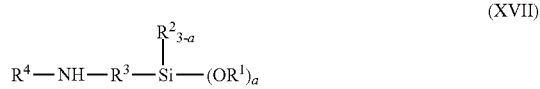

(XVII)

wherein each $R^1$ is independently an alkyl group of from 1 to 6 carbon atoms and preferably from 1 to 3 carbon atoms, each $R^2$ is independently an alkyl group of from 1 to 4 carbon atoms or phenyl group, preferably from 1 to 3 carbon atoms, $R^3$ is a divalent alkylene group of from 1 to 12 carbon atoms, preferably of from 1 to 3 carbon atoms, and more preferably 3 carbon atoms and R[4] is an alkyl group of from 1 to 12 carbon atoms, phenyl group, hydrogen or —R$^3$SiR$^2_{3-a}$(OR$^1$)$_a$ group and is preferably an alkyl of from 1 to 4 carbon atoms and a is preferably an integer of from 1 to 3.

Examples of primary and secondary aminosilanes include, but are not limited to, 3-aminopropyltrimethoxysilane, 3-aminopropyltriethoxysilane, 4-amino-3,3-dimethylbutyltrimethoxysilane, 4-amino-3,3-dimethylbutyldimethoxymethylsilane, N-methylaminoisobutyltrimethoxysilane, N-ethylaminoisobutyltrimethoxysilane, N-ethyl-3-amino-2-methylpropyldiethoxymethylsilane, N-ethyl-3-amino-2-methylpropyltriethoxy silane, N-ethyl-3-amino-2-methylpropylmethyldimethoxysilane, N-butyl-3-aminopropyltrimethoxysilane, N-butyl-3-amino-2-methylpropyltrimethoxysilane, N-ethyl-4-amino-3,3-dimethylbutyldimethoxymethylsilane and N-ethyl-4-amino-3,3-dimethylbutyltrimethoxysilane, N,N-bis-(3-trimethoxysilylpropyl) amine and the like, with N-ethylaminoisobutyltrimethoxysilane, N-ethyl-4-amino-3,3-dimethylbutyltrimethoxysilane and N-butyl-3-aminopropyltrimethoxysilane being preferred.

The conditions for the silylation of the polycarbonate diol (XII), the hydroxyl-terminated polyurethane (XIII) and/or mixtures thereof with isocyanatosilane (XVI) can include reaction temperatures of from 20 to 180° C. and preferably from 60 to 130° C., pressures of from 10 to 300 kilopascal, preferably from 50 to 150 kilopascal and more preferably 100 kilopascal, and reactions times of from 0.50 to 24 hours and preferably from 2 to 8 hours.

The reactions can be carried out in the absence or presence of catalysts used to catalyze the urethane-forming reaction. Known and conventional catalysts for the urethane-forming reaction are contemplated. Suitable catalysts include metal and non-metal catalysts, as discussed above for the reaction of polycarbonate diol (XII), the hydroxyl-terminated polyurethane (XIII) and/or mixtures thereof with polyisocyanates. These catalysts are employed at from 0.001 to 5 weight percent, more specifically from 0.001 to 2 weight percent and even more specifically, from 0.005 to 1 weight percent, and even more preferably 0.005 to 0.1 weight percent, based on the weight of the polycarbonate diol (XII).

In one embodiment of the invention, the catalyst is 20 ppm Sn or 120 ppm of catalyst compound, such as dibutyltin dilaurate, dibutyltin diacetate, or dioctyltin diacetate, relative to the polycarbonate diol (XII); a weight percent of 0.012%. It is contemplated that the catalysts used in the formation of the hydroxyl-terminated polyurethane (XIII) can also be used in the reaction of the hydroxyl-terminated polyurethane (XIII) with the isocyanatosilane (XVI).

The molar ratio of the hydroxyl groups of the polycarbonate diol (XII), the hydroxyl-terminated polyurethane (XIII) and/or mixtures thereof to the isocyanatosilane (XVI) is from 0.75:1.0 to 1.5:1, and preferably from 0.95:1 to 1.1. In one embodiment, a molar excess of the isocyanatosilane (XVI) is used.

In one embodiment, the excess of isocyanatosilane (XVI) that is present at or near the completion of the silylation reaction is reacted with an active hydrogen-containing compound to eliminate the presence of isocyanate groups from the reaction mixture. Active hydrogen-containing compounds include alcohols, diols, amines, mercaptans, lactams and mixtures thereof. Representative and non-limiting examples of active hydrogen-containing compounds include methanol, ethanol, isopropyl alcohol, diethylamine, dipropylamine, pyrrolidone, caprolactam, and mixtures therefore. The active hydrogen containing compound is used in molar excess to the remaining isocyanate group of the isocyanatosilane (XVI) present at or near the end of the silylation reaction. In one embodiment, the amount of isocyanate present in the reaction mixture is determined in accordance with ASTM D2572-97(2010), Standard Test Method for Isocyanate Groups in Urethane Materials or Prepolymers.

The conditions for the silylation of the isocyanate-terminated polyurethane (XIV) with an aminosilane (XVII) can include reaction temperatures of from 0 to 180° C. and preferably from 60 to 130° C., pressures of from 10 to 300 kilopascal, preferably from 50 to 150 kilopascal and more preferably 100 kilopascal, and reactions times of from 0.50 to 24 hours and preferably from 2 to 8 hours.

The reactions can be carried out in the absence or presence of at least one catalyst used to catalyze the urethane-forming reaction. Known and conventional catalysts for the urethane-forming reaction are contemplated. Suitable catalysts include metal and non-metal catalysts, as discussed above for the reaction of polycarbonate diol (XII), the hydroxyl-terminated polyurethane (XIII) and/or mixtures thereof with polyisocyanates (XV). These catalysts are employed at from 0.001 to 5 weight percent, more specifically from 0.001 to 2 weight percent and even more specifically, from 0.005 to 1 weight percent, and even more preferably 0.005 to 0.1 weight percent, based on the weight of the polycarbonate diol (XII) used in the preparation of the isocyanato-terminated polyurethane (XIV).

In one embodiment of the invention, the catalyst is 20 ppm Sn or 120 ppm of catalyst compound, such as dibutyltin dilaurate, dibutyltin diacetate or dioctyltin diacetate, relative to the polycarbonate diol (XII). It is contemplated that the catalysts used in the formation of the isocyanato-terminated polyurethane (XIV) can also be used in the reaction of the isocyanato-terminated polyurethane (XIV) with the aminosilane (XVII).

The molar ratio of the isocyanate groups of the isocyanato-terminated polyurethane (XIV) to the aminosilane is from 0.75:1.0 to 1.5:1, and preferably from 0.95:1 to 1.1. In one embodiment, a molar excess of the aminosilane is used. In one embodiment, the amount of isocyanate present in the isocyanate-terminated polyurethane (XIV) is determined in accordance with ASTM D2572-97(2010), Standard Test Method for Isocyanate Groups in Urethane Materials or Prepolymers.

In one embodiment of the invention, moisture-curable silylated polycarbonate resin (ii) has a number average molecular weight as measured in accordance with ASTM D5296-11, Standard Test Method for Molecular Weight Averages and Molecular Weight Distribution of Polystyrene by High Performance Size-Exclusion Chromatography of from 800 to 20,000, preferably from 1500 to 10,000, and more preferably from 2,000 to 8,000.

In another embodiment, moisture-curable silylated polycarbonate resin (ii) has a crystalline content as measured by differential scanning calorimetry (DSC), as described in ASTM F2625-0, Standard Test Method for Measurement of Enthalpy of Fusion, Percent Crystallinity, and Melting Point of Ultra-High-Molecular Weight Polyethylene by Means of Differential Scanning Calorimetry of not greater than 10 weight percent crystallinity, and preferably not greater than 1 weight percent crystallinity, based on the total weight of the moisture-curable silylated polycarbonate resin (ii).

In yet another embodiment of the invention, moisture-curable silylated polycarbonate resin (ii) has a viscosity as measured in accordance with ASTM D1084-08, Standard Test Method for Viscosity of Adhesives of not greater than 100 Pascal-second, and preferably from 0.05 to 50 Pascal-second.

In one embodiment of the invention, the moisture-curable silylated polycarbonate resin (ii) has the structure of formula (I), wherein $R^1$ is methyl or ethyl; $R^2$ is methylene, ethylene, propylene, 2-methylethylene or 2-methylpropylene; $R^4$ is methyl, ethyl or butyl; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is a divalent alkylene group of from 1 to 6 carbon atoms or a cycloalkylene group of from 6 to 10 carbon atoms; a is 2 or 3, preferably 3, b is 1, c is 0, 1 or 2; m is 5 to 15; n is 5 to 15.

In another embodiment, the moisture-curable silylated polycarbonate resin (ii) has the structure of formula (I), wherein $R^1$ is methyl or ethyl; $R^2$ is methylene, ethylene, propylene, 2-methylethylene or 2-methylpropylene; $R^4$ is methyl, ethyl or butyl; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is

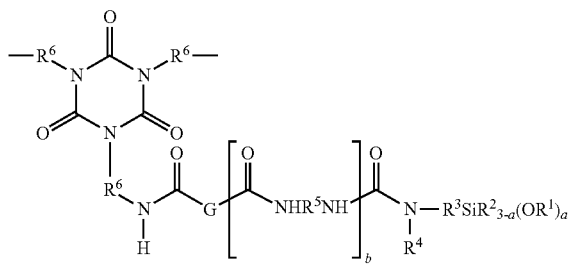

where G is previously defined; a is 2 or 3, preferably 3, b is 1, c is 0, 1 or 2; m is 5 to 15; n is 5 to 15.

In yet another embodiment of the invention, the resin composition comprises at least one moisture-curable silylated polycarbonate resin (ii)(a) of formula (I), wherein $R^{10}$ is a

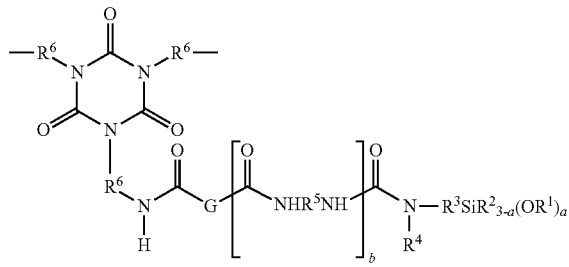

and at least one moisture-curable silylated polycarbonate resin (ii)(b) of formula (XII), wherein $R^{10}$ is a divalent alkylene group of from 1 to 6 carbon atoms or a cycloalkylene group of from 6 to 10 carbon atoms. The resin composition comprising at least two moisture-curable silylated polycarbonate resins (ii)(a) and (ii)(b) with a molar ratio of (ii)(a) to (ii)(b), in one embodiment of the invention, of from 0.3:1.5 to 1.5:0.3 and in another embodiment of the invention, of from 0.7:1.0 to 1.0:0.7.

In one embodiment of the invention, the moisture-curable silylated polycarbonate resin (ii) has the structure of formula (I), wherein $R^1$ is methyl or ethyl; $R^2$ is methylene, ethylene, propylene, 2-methylethylene or 2-methylpropylene; $R^4$ is hydrogen; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is a divalent alkylene group of from 1 to 6 carbon atoms or a cycloalkylene group of from 6 to 10 carbon atoms; a is 2 or 3, preferably 3, b is 0, c is 0, 1 or 2; m is 5 to 15; n is 5 to 15.

In one more embodiment of the invention, the moisture-curable silylated polycarbonate resin (ii) has the structure of formula (I), wherein $R^1$ is methyl or ethyl; $R^2$ is methylene, ethylene, propylene, 2-methylethylene or 2-methylpropylene; $R^4$ is hydrogen; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is

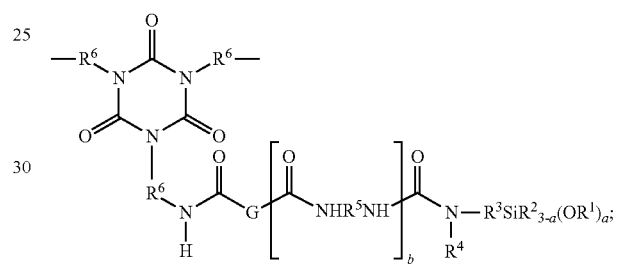

a is 2 or 3, preferably 3, b is 0, c is 0, 1 or 2; m is 5 to 15; n is 5 to 15.

In a further embodiment of the invention, the resin composition comprises at least one moisture-curable silylated polycarbonate resin (ii)(c) of formula (XII), wherein $R^{10}$ is a

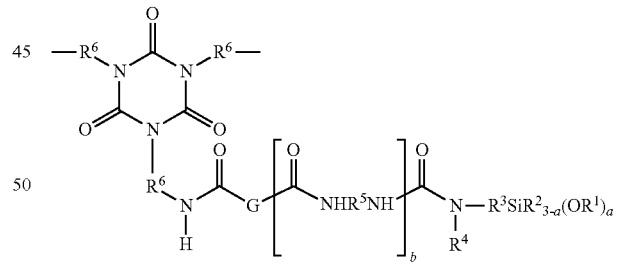

and at least one moisture-curable silylated polycarbonate resin (ii)(d) of formula (I), wherein $R^{10}$ of formula II is divalent alkylene group of from 1 to 6 carbon atoms or a cycloalkylene group of from 6 to 10 carbon atoms. The composition comprising at least one moisture-curable silylated polycarbonate resin (ii)(c) and at least one moisture-curable silylated polycarbonate resin (ii)(d) has a molar ratio of (ii)(c) to (ii)(d) of from 0.3:1.5 to 1.5:0.3.

In one preferred embodiment of the invention, the moisture-curable silylated polycarbonate resin (ii), designated herein as Moisture-curable Silylated Polycarbonate Resin A, has the structure of formula (I), wherein:

a is 3 and b is 1; $R^1$ is methyl; $R^2$ is methyl; $R^3$ is 2-methyl-1,3-propylene; $R^4$ is ethyl; $R^5$ is a divalent isophoronyl group; and G is characterized in having m is 6.0; n is 7.7, c is 1; $R^6$ is 1,3-propylene; $R^7$ is 1,6-hexylene; $R^8$ is 1,5-pentylene; $R^9$ is 1,5-pentylene and $R^{10}$ is trivalent 1,3,5-(3-methylene-3,5,5-trimethylcyclohexyl)-[1,3,5]-triazinane-2,4,6-trione group.

Resin Composition.

According to another aspect of the invention, there is provided the resin composition comprising at least one organic resin (i) and at least one moisture-curable silylated polycarbonate resin (ii), and may include one or more other ingredients that are commonly included in known and conventional resin compositions, especially coatings. The resin composition can generally contain from 50 to 99 weight percent, preferably from 65 to 95 weight percent and more preferably 75 to 90 weight percent of the organic resin(s) (i), and from 1 to 50 weight percent, preferably from 5 to 35 weight percent and more preferably 10 to 25 weight percent of moisture-curable silylated polycarbonate resin(s) (ii), based on the total weight of the organic resin(s) (i) and moisture-curable silylated polycarbonate resin(s) (ii).

Among the additional ingredients that can be used in resin compositions in accordance with the invention are organoalkoxysilanes and silicone hardcoats to improve hardness and scratch resistance, metal particulates and metal oxide particulates to improve thermal properties and to pigment the resin composition, curing catalysts, leveling agents, antioxidants, UV stabilizers, crosslinkers, dyes, fillers, adhesion promoters, such as silanes containing reactive functional groups, and solvents. Combinations of these additional ingredients may also be used.

Suitable organoalkoxysilanes include methyltrimethoxysilane, methyltriethoxysilane, tetraethoxysilane, ethyltriethoxysilane, diethyldiethoxysilane, tetramethoxysilane, dimethyldimethoxysilane or mixture thereof which can form a partial condensate. Where used, organoalkoxysilanes and/or their partial condensates can be present at a level of from 0.5 to 50 weight percent, and preferably from 3 to 20 weight percent, based on the weight percent of the total weight of the resin composition.

Metal particulates and metal oxide particulates that may be included in the resin composition include the metal and metal oxides of zinc, titanium, iron, aluminum, cobalt, iron, cupper, magnesium, manganese, antimony, lead, calcium, and mixtures thereof. The metal particulates and metal oxide particulates may be used to improve the heat conductivity and/or electrical conductivity of the resin compositions containing the organic resin (i) and moisture-curable silylated polycarbonate resin (ii), to improve the corrosion resistance of metallic substrates in contact with these resin compositions, or to add pigmentation to said compositions. For example, particulate iron and iron oxides improve the transport of heat through these resin compositions. Resin compositions containing the organic resin (i) and moisture-curable silylated polycarbonate resin (ii) and particulate zinc (powder) protects metallic surfaces, such as iron or steel, from corrosion. Various metallic oxides can be used to pigment these resin compositions. Representative and non-limiting pigments include red ochre, yellow ochre, white lead, azurite, smalt, ultramarine can be used for this purpose. Where utilized, particulate metal and/or metal oxide can be incorporate in the moisture-curable coating composition at a level of from 0.1 to 80 weight percent, and preferably from 5 to 40 weight percent, where the weight percent is based on the total weight of the resin composition.

The resin composition of this invention may include a hydrolysis and/or condensation catalyst in a known or conventional amount in order to promote the reactions of the alkoxysilyl group on the moisture-curable silylated polycarbonate resin (i) with moisture and the subsequent condensation reactions of the byproduct silanols. Suitable catalysts include metal and non-metal catalysts. The catalysts include those catalysts that have been used to prepare the moisture-curable silylated polycarbonate resin. Examples of the metal portion of the metal cure catalysts useful in the present invention include, but are not limited to, tin, titanium, zirconium, lead, iron cobalt, antimony, manganese, bismuth and zinc compounds. Other suitable non-limiting examples of catalysts include chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Al, Be, Mg, Zn, Cd, Pb, Ti, Zr, Sn, As, Bi, Cr, Mo, Mn, Fe, Co, Ni, and metal oxide ions as $MoO_2{++}$, $UO_2{++}$, and the like; alcoholates and phenolates of various metals such as $Ti(OR)_4$, $Sn(OR)_4$, $Sn(OR)_2$, $Al(OR)_3$, $Bi(OR)_3$ and the like, wherein R is alkyl or aryl of from 1 to 18 carbon atoms, and reaction products of alcoholates of various metals with carboxylic acids, beta-diketones, and 2-(N,N-dialkylamino)alkanols, such as well-known chelates of titanium obtained by this or equivalent procedures. Further cure catalysts include organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltin dilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

These catalysts are employed at from 0.001 to 5 weight percent, preferably from 0.001 to 2 weight percent and more preferably, from 0.005 to 1 weight percent, and even more preferably 0.005 to 0.1 weight percent, based on the total weight of the resin composition. In one embodiment of the invention, the catalyst is from 200 ppm to 10,000 ppm of catalyst compound, such as tin, dibutyltin dilaurate, dibutyltin diacetate or dioctyltin diacetate, based on the total weight of the resin composition.

The resin composition herein can also include one or more surfactants as leveling agents. Examples of suitable leveling agents include fluorinated surfactants such as FLUORAD™ (3M Company), silicone polyethers such as Silwet® and CoatOSil® (Momentive Performance Materials, Inc.) and BYK (BYK Chemie).

A resin composition which contains organic resins (i) which have UV-reactive polymerizable functional groups, may contain a suitable initiator. UV photo-initiators capable of initiating free radical polymerization can be used. The curing of the organic resins(s) further contain both UV curable cationically polymerizable functional groups and free radically polymerizable groups may preferably contain at least two UV photo-initiators, namely one to cure the cationic UV curable functional and one to cure the free radical UV curable functional group.

Photo-initiators, photosensitizers, or both photo-initiators and photosensitizers can be included in resin compositions which are curable. These materials are generally known in the art. Examples of photosensitizers include benzophenone, anthraquinone, and thioxanthone. Examples of photo-initiators include isobutyl benzoin ether, mixtures of butyl isomers of butyl benzoin ether, alpha,alpha-diethoxyacetophenone, and alpha,alpha-dimethoxy-alpha-phenylacetophenone. Other examples of photoinitiators and photosensitizers can be found in U.S. Pat. No. 4,017,652, the contents of which are incorporated herein by reference.

Representative and non-limiting free radical UV curing photo-initiators include 1-phenyl-2-hydroxy-2-methyl-1-propanone, oligo{2-hydroxy-2 methyl-1-[4-(methylvinyl) phenyl]propanone}, 2-hydroxy 2-methyl 1-phenyl propan-1 one, bis (2,6-dimethoxybenzoyl)-2,4,4-trimethylpentyl phosphine oxide, 2,4,6-trimethyl benzoyl-diphenyl phosphine oxide, 2-methyl-1-[4(methylthio)-2-morpholinopropan]-1-one, 1-hydroxycyclohexyl phenyl ketone, 4-(2-hydroxy) phenyl-2-hydroxy-2-(methylpropyl)ketone, 2,2-dimethoxy-2-phenyl acetophenone, benzophenone, benzoic acid, (n-5,2,4-cyclopentadien-1-yl) [1,2,3,4,5,6-n)-(1-methylethyl) benzene]-iron(+) hexafluorophosphate, 4-(dimethyl amino)-ethyl ether and mixtures thereof. Commercially available free radical curing UV photo-initiators include 2-hydroxy 2-methyl 1-phenyl propan-1 one, such as DAROCURE™ 1173, commercially available from Ciba Specialty Chemicals, 1-hydroxycyclohexylphenylketone, such as IRGACURE™ 184, available from Ciba Specialty Chemicals, a 50:50 weight basis mixture of 1-hydroxycyclohexylphenylketone and benzophenone, such as IRGACURE 500, available from Ciba Specialty Chemicals, bis (n,5,2,4-cyclopentadien-1-yl)-bis[2,6-difluoro-3-(1H-pyrol-1-yl)phenyl]titanium, such as IRGACURE 784 DC, available from Ciba Specialty Chemicals; 2-benzyl-2-N,N-dimethyl amino-1-(4-morpholinophenyl)-1-butanone, such as IRGACURE 369, available from Ciba Specialty Chemicals and the EB3, KB1, TZT, KIP 100F, ITX, EDB, X15 and KT37 series of ESACURE™ photo-initiators, commercially available from Sattomer Inc. Preferably, 1 to 5 percent by weight free radical UV curing photo-initiator, based on the weight of the organic resin (i) is employed.

UV radiation of one or more different wavelengths can be used to cure the organic resins (i) which contain UV-reactive polymerizable functional groups. For example, a medium pressure mercury arc lamp on a cure machine emits a broad spectrum of UV-A, UV-B, and UV-C radiation. The photo-initiator(s) in the coating are responsive to one or more of the wavelengths emitted by the mercury arc lamp. For example, UV radiation in the wavelength range of about 325 nanometers (nm) to about 400 nm provides what is known as deep curing. Simultaneous with the application of the first wavelength, UV radiation in the wavelength range of about 240 nm to about 300 nm is produced by the arc lamp, and provides surface curing and assists in complete curing of the floor coating.

While described with respect to specific wavelengths of UV radiation, other wavelengths are certainly possible. In fact, coatings responsive to most any wavelengths are possible, provided that the UV reactive components within the UV-curable sealant coating composition are matched to the particular wavelengths of emitted UV radiation.

By providing multiple wavelength UV radiation as described herein, the present resin compositions and methods are capable of curing resin compositions with minimal power input. As a result, they may be powered from, for example, a 220-volt, 20-ampere wall outlet or, alternatively, from a separate generator. The resin composition may be cured by a portable UV irradiator with, for example, 150 Watts/inch (2.54 cm) of UV irradiation. However, depending on the exact resin composition, ranges below and above 150 Watts/inch (2.54 cm) of UV irradiation may be used. One benefit of instantly curing the resin composition which contain organic resins (i) having UV-reactive polymerizable functional groups, is that the cured resin composition becomes available for use right after the curing process is finished.

The resin composition can also include one or more UV absorbers employed in a known or conventional amount such as the benzotriazoles. Specific examples of UV absorbers include 4-[gamma-(trimethoxysilyl) propoxyl]-2-hydroxy benzophenone and 4-[gamma-(triethoxysilyl) propoxyl]-2-hydroxy benzophenone and 4,6-dibenzoyl-2-(3-triethoxysilylpropyl) resorcinol. When the preferred UV absorbers are used, it is important that the UV absorber co-condenses with other reacting species by thoroughly mixing the resin composition before applying it to a substrate. Co-condensing the UV absorber prevents resin composition performance loss caused by the leaching of free UV absorbers to the environment during weathering.

One or more filler(s) may also be included in resin compositions in accordance with the present invention. Examples of suitable fillers include minerals or polymers or mixtures thereof. Typical mineral fillers include silica, mica, ground limestone, talc, gypsum, clays, etc. Typical polymeric fillers include thermosetting rubbers, such as neoprenes, rubber particle fillers, such as for example, Kraton™ rubber particles, chloroprenes, EPDM, urethanes, etc. The preferred mineral fillers are silica, ground limestone, titanium dioxide and clays.

The one or more optional filler(s) of the present invention are present in the amount of from 1 to 120 percent by weight, more specifically from 5 to 80 weight percent, and even more specifically, from 25 to 75 weight percent, based on the total weight of the resin composition.

In one embodiment of the present invention, when the organic resin (i) contains one or more epoxy groups, a curing agent containing the polyamine, or a compound which contains both amino groups and amido groups, and optionally an accelerator. The epoxy resin can be blended or mixed with the curing agent in any order at a temperature below the cure temperature, which is typically below about 100° C.

In still another embodiment of the invention, all of the components are mixed together at one time. The manner in which the formulation is mixed is typically not critical. The ingredients may be added all at once or one at a time. Preferably, when fillers are included, one half of each filler is mixed with the epoxy resin and the other half is mixed with the curing agent, in order to keep the same viscosity. This can allow for convenience with regard to better and easier mixing.

The components may be mixed by hand or by using any known mechanical apparatus which is commonly used in the industry. Preferably, in order to assure complete mixing, a mechanical apparatus such as a Cowles disperser, Hockmeier mixer or Ross Double Plantetary, is used.

Further to facilitate handling or application or use in various environments, the curing agent or the epoxy resin system can be diluted with minor amounts of ketone solvents, ester solvents or aromatic solvents.

The resin composition containing organic resin(s) (i) and curatives, such as for example, polyamines or compounds, which contain both amino groups and amido groups, can be cured at a temperature within the range of from about −40° C. to 100° C., preferably from −10° C. to 100° C., for a time effective to cure the epoxy resin.

The resin composition herein can also include one or more antioxidants in a known or conventional amount such as the hindered phenols, such as for example, IRGANOX® 1010 from Ciba Specialty Chemicals, dyes, such as for example, methylene green, methylene blue, and the like, in the customary amounts.

The resin composition may contain one or more organic solvents to adjust its solid content to a predetermined level. The organic resin (i) and the moisture-curable silylated polycarbonate (ii) should be soluble in the solvent. Suitable solvents may be determined using Hansen solubility parameter and the equation:

$$[4(\delta_{d\text{-}solvent}-\delta_d)^2+(\delta_{p\text{-}solvent}-\delta_p)^2+(\delta_{h\text{-}solvent}-\delta_h)^2]^{0.5}=R'$$

wherein $\delta_d$ is the Hansen dispersion solubility parameter, $\delta_p$ is the Hansen polar solubility parameter, $\delta_h$ is the Hansen hydrogen bonding parameter of the organic resin (i) and $\delta_{d\text{-}solvent}$ os the Hansen dispersion solubility parameter of the solvent, $\delta_{p\text{-}solvent}$ is the Hansen polar solubility parameter and $\delta_{h\text{-}solvent}$ is the Hansen hydrogen bonding parameter, which are determined at 25° C., and R' is the solubility parameter distance the solvent and the organic resin (i). If the R' for a given resin is less than or equal to 9.0, more particularly 7.0 and even more particularly 5.0, then the solvent may be suitable for use in the resin compositions.

Suitable examples of such solvents include C1-C4 alkanols such as methanol, ethanol, propanol, isopropanol, and butanol, glycols such as ethylene glycol, 1,3-propanediol, 1,4-butanediol, diethylene glycol and dipropylene glycol, glycol ethers such as propylene glycol monomethylether and propylene glycol dimethyl ether, aromatic solvents, such as toluene and xylenes, and esters such as methyl acetate, ethyl acetate, n-butyl acetate, 2-acetyloxyethanol, 2-acetyloxy-2-methylethanol, ketone solvents, such as dimethyl ketone, methyl ethyl ketone, diacetone alcohol and mixtures thereof. After any adjustment with optional solvent(s), the resin composition herein will advantageously contain from 1 to 99 weight percent solvent, preferably from 10 to 70 weight percent solvent, and more preferably from 20 to 40, where the weight percent of the solvents is based on the total weight of the resin composition.

It is generally preferred that the moisture-curable coating composition herein be substantially free of water. In one embodiment, the resin composition contains from 0 to not more than 200 ppm water and in another embodiment that it contains 0 to not more than 50 ppm water. If desired, a water scavenger, such as for example, a vinyltrimethoxysilane, can be added to the resin composition in known and conventional amounts to prevent or inhibit undesirable hydrolysis/condensation of its moisture-curable silylated polycarbonate resin component(s) during storage.

Although a primer can be used advantageously, if desired, resin compositions of the invention can be applied directly to the surface of the selected substrate, e.g., a ceramic, concrete, cementitious substrates, polymeric or metallic surface, without prior application of a primer.

Examples of ceramic substrates include architectural stone, e.g., granite and marble, ceramic tile, glass and vitreous materials of all kinds, and the like. Examples of concrete include reinforced concrete, pre-cast concrete, air entrained concrete and polymer concrete. Examples of cementitious substrates include Portland cement, mortar, stucco ad grout. Examples of polymeric substrates include polycarbonates, acrylic polymers, for example, poly(methylmethacrylate), and the like, polyesters, for example, poly (ethylene terephthalate), poly(butylene terephthalate), and the like, polyamides, polyimides, acrylonitrile-styrene copolymer, styrene-acrylonitrile-butadiene terpolymers, polyvinyl chloride, polyethylene, and the like. Examples of metal substrates include aluminum, copper, zinc, iron, tin and alloys containing these metals such as brass, steels of all types, e.g., cold rolled steel, stainless steel, galvanized steel, etc., and the like.

Resin compositions in accordance with the invention can be applied to the surface of the selected substrate employing any of several known or conventional coating methods such as spraying, dipping, roll coating, and the like, followed by moisture-curing of the coating layer.

By incorporating the moisture-curable silylated polycarbonate resin(s) (ii) into resin compositions containing organic resins(s)(i) in accordance with the invention, improvements in gloss retention and color retention in QUV testing, and improved adhesion on metallic, glass or mineral substrate can be achieved versus.

EXAMPLES

The following examples are illustrative of the present invention and the results obtained by the test procedures. It is to be understood the examples are not intended, nor should they be construed, as being limiting upon the scope of the invention. A person skilled in the applicable arts will appreciate from these examples that this invention can be embodied in many different forms other than as is specifically disclosed.

Example 1. Synthesis of Moisture-Curable Silylated Polycarbonate Resin A

Into a 500 mL round bottom flask equipped with a mechanical stirrer, dropping funnel, reflux condenser and nitrogen line, were charged polycarbonate diol A (a hydroxyl-terminated polycarbonate containing 45 mole percent 1,6-hexyl groups and 55 mole percent 1,5-pentyl groups, hydroxyl number of 56, equivalent weight of 1001.5 grams/mole, 124.31 grams, 0.0621 mol) and Solvesso 100 aromatic solvent (52 grams, obtained from ExxonMobil). The mixture was stirred under nitrogen and heated to 90° C. A mixture of isophorone diisocyanate (31.17 grams, 0.1402 mole) and isophorone diisocyanate trimer in butyl acetate (80.29 grams, 0.084 mol, obtained from Vencore X Chemical under the tradename Tolonate™ IDT 70B) were added and reacted at 90° C. for 2.5 hours. An FTIR spectrum of the reaction mixture did not detect any residual hydroxyl groups. The viscosity of the intermediate was 10.2 Pascal-second. N-ethyl-3-amino-2-methylpropyltrimethoxysilane (89.31 grams, 0.4 mol, obtained from Momentive Performance Materials under the tradename A-Link® 15 silane) was added at 90° C. The reaction mixture underwent an exothermic reaction, heating the mixture to 118° C. The mixture was stirred 1.15 hours at 90° C. and then cooled to 46.5° C. FTIR analysis indicated that the isocyanate content was not detectable. The viscosity of the reaction product was 27.78 Pascal-second. Vinyltrimethoxysilane (3.0 grams) was added as a desiccant. The final viscosity was 23.65 Pascal-second. The moisture curable silylated polycarbonate resin A will be referred to as Silylated Resin A.

Example 2. Determination of Hansen Solubility Parameter for Silylated Resin A

The Hansen solubility parameters were determined for Silylated Resin A. Into 100 grams of Silylated Resin A, prepared in Example 1, were added 33 grams of solvent. The solvents and their Hansen solubility parameters is given in Table A. The mixture was equilibrated overnight at about 25° C. and then the visual compatibility was determined.

Each combination of solvent and Silylated Resin A was rated as either "Good" or 1, which indicated clear, "Fair" or 2 which indicated very slightly hazy and "Incompatible" or 3, which indicated very hazy and formation of two phases. Once the determinations were made, the data (ranking 1, 2 or 3) for each solvent were graph on three plots, where the x and y coordinates for the plots were Su-solvent versus $\delta_p$-solvent, $\delta_h$-solvent versus $\delta_d$-solvent and $\delta_p$-solvent versus $\delta_h$-solvent. Through trial and error, the Hansen dispersion parameter $\delta_d$, polar parameter $\delta_p$, and hydrogen bonding parameter were determined as 22.5, 9.0 and 9.0, respectively, for the Silylated Resin A.

TABLE A

Solvents Tested and their Corresponding Solubility parameters

| Solvent Material Tested | $\delta_d$/MPa$^{1/2}$ | $\delta_p$/MPa$^{1/2}$ | $\delta_h$/MPa$^{1/2}$ |
|---|---|---|---|
| n-Butyl Acetate | 15.8 | 3.7 | 6.3 |
| Xylene | 17.6 | 1.0 | 3.1 |
| Toluene | 18.0 | 1.4 | 2.0 |
| Parachlorobenzotrifluoride | 18.0 | 5.9 | 3.9 |
| Ketones | 16.0 | 9.0 | 5.1 |
| Alcohols | 15.8 | 6.1 | 16.4 |
| Ethylene Glycol monomethyl ether | 16.2 | 9.2 | 16.4 |
| Heptane | 14.9 | 0.0 | 0.0 |
| Cyclohexane | 14.9 | 0.0 | 0.2 |
| Water | 15.5 | 16.0 | 42.3 |
| Mineral Spirits/Naphtha | 15.8 | 0.1 | 0.2 |
| Ethylene Glycol | 17.0 | 11.0 | 26.0 |

Example 3

Preparation of White Resin Paste Containing Acrylic Resin and Silylated Resin A

The solubility of Silylated Resin A in an Acrylic Resin was determined.

Acrylic resin (7.0 grams, Setalux 17-1291 commercially available from Allnex, a 50 percent by weight copolymer of poly(methyl methacrylate/alkyl methacrylate) in solvent mixture of xylenes, toluene and ethyl benzene) of were mixed with 1.13 grams of n-butyl acetate until a clear solution was obtained. The temperature of the acrylic resin and n-butyl acetate mixture was maintained at 25° C. using a constant temperature bath. The Silylated Resin A (1.88 grams) was added and stirred for 12 hours. The mixture of acrylic resin, Silylated Resin A and n-butyl acetate was drawn down onto a glass slide using a 150 micron drawdown square. The n-butyl acetate was evaporated to form a dry film of acrylic resin and Silylated Resin A. The cast film was placed into a microscope and the image was magnified 40 times. The film is observed and the image is clear. The Silylated Resin A was considered "soluble" in the acrylic resin.

Examples 4,5 and 6 and Comparative Examples I and II. Preparation of White Resin Paste Containing Acrylic Resin and Silylated Resin a Into a metal can fastened securely to a mixer provided with a grinding blade were added approximately 50 mL of ZrO beads for grinding (Grinding Media Depot, A Norstone Co., CNCZ-BG-2.0-2.2 mm). The acrylic resin (200 grams, Setalux 17-1291, 50 weight percent solids, available from Allnex) and titanium oxide pigment (300 grams, R-960 from Chemours) were charged into the mixer. The mixer was set to a medium-high speed for Cowles Mill grinding until the resin and pigment were homogenously mixed together. Once the mixture appeared homogeneous, the n-butyl acetate (100 grams) was added to the mixture and the mixer was set to high speed for approximately 35 minutes. A Hegman grind was checked after 35 minutes to determine the quality of the grind. A Hegman grind rating of approximately 5 was achieved. At this point, the grind paste was filtered and collected.

The white resin paste (3.5 grams) was added to a 20 mL vial. An additional 3.9 grams of the acrylic resin, 3.2 grams of n-ethyl acetate and 1.4 grams of Silylated Resin A was added. The mixture was mixed by first hand shaking the vial, followed by placing a small magnetic stirrer bar into the vial, and placing the vial on a magnetic stirrer for approximately 40 minutes. The sample was sprayed approximately 24 hours after being formulated onto metal substrate and allowed to dry for approximately 3 days prior to being tested in QUV-A and QUV-B.

Using a similar method, comparative Examples I and II, containing no Silylated Resin A and 83.3 weight percent, based on the total weight of acrylic resin and Silylated Resin A and Examples 4, 5 and 6 containing 10, 30 and 50 weight percent Silylated Resin A were prepared.

Spray Application of Resin Compositions

The coating compositions of Examples 4, 5 and 6 and comparative Examples I and II were separately applied by spraying to the bare, sandblasted, and cleaned cold roll steel test panels with dimensions 4 inches×6 inches. Spraying was carried out with a StartingLine HVLP gravity fed siphon spray hand spray gun (DeVilbiss). Each of the two moisture-curable coating compositions was sprayed at a wall pressure of 15 lb/in². The spraying technique was a side-to-side sweep of a spray onto a panel at a rate of approximately 1,000 inch per minute, indexing up and down the panel approximately 2 inches per sweep until approximately 5.0 to 7.0 mils of dry coating thickness was applied to the test panels.

Cure Time and Conditioning

Once the test panels were coated with the resin compositions, the resin compositions were then moisture-cured under ambient conditions for at least 7 days.

After one week of ambient moisture curing, panels coated with each of the cured coating compositions of Examples 4, 5 and 5 and panels coated with the Comparative Examples I and II tested in accordance with ASTM G154 Cycling.

The samples were evaluated for gloss and color retention before and after exposure to QUV-A and B radiation for 2000 hours.

Scribe adhesion was rated after 2000 hours exposure to QUV-A and QUV-B from 1 to 5, with 5 as the strongest adhesion and 1 the weakest. The results are presented in Table B.

TABLE B

Table B. Initial gloss color and change in gloss and color after ageing under QUV-A and QUV-B for 2000 hours and adhesion.

| Sample | Amount of Silylated Resin A, weight percent | Initial Gloss | QUV-A Gloss Δ 60 | QUV-A Color Δ E | QUV-B Gloss Δ 60 | QUV-B Color Δ E | Scribe Glass Adhesion |
|---|---|---|---|---|---|---|---|
| Comp. Ex I | Control | 78.6 | 67.8 | 1.25 | 27.7 | 4.44 | 1 |
| Example 4 | 10% | 83.2 | 44.1 | 0.83 | 24.1 | 3.51 | 4 |
| Example 5 | 30 | 85.7 | 29.0 | 0.37 | 20.0 | 1.65 | 5 |
| Example 6 | 50 | 84.5 | 20.2 | 0.38 | 23.7 | 0.48 | 5 |
| Comp. Ex. II | 83.3 | 34.5 | 25.3 | 0.42 | 19.5 | 0.36 | 5 |

Unexpectedly, the incorporation of Silylated Resin A of between 10 to 30 weight percent, based on the total weight of aryclic resin (organic resin (i)) and Silylated Resin A (moisture-curable silylated polycarbonate resin (ii)) inhibited the loss of gloss and formation of yellow color when exposed to the QUV-A and QUV-B weathering tests. When the Silylated Resin A was high (83.3 weight percent), the initial gloss was low at 34.5. Similar trends were observed for changes in color.

The scribed adhesion test demonstrated that the Silylated Resin A surprisingly improved adhesion of the acrylic resin.

Example 5. Preparation of a Moisture-Curable Silylated Resin Derived from the Reaction of Polycarbonate Diol Containing 1,6-Hexyl and 1,5-Pentyl Groups, Isophorone Diisocyanate, Isophrone Diisocyanate Trimer, Trimethylol Propane and 3-isocyanatopropyltrimethoxysilane Into a 500 mL round bottom flask equipped with a mechanical stirrer, dropping funnel, reflux condenser and nitrogen line, were charge polycarbonate diol A (a hydroxyl-terminated polycarbonate containing 45 mole percent 1,6-hexyl groups and 55 mole percent 1,5-pentyl groups, hydroxyl number of 56, equivalent weight of 1001.5 grams/mole, 162 grams, 0.0581 mol), trimethyol propane (22.5 grams, 0.16 mol) and n-butyl acetate (75 grams). The mixture was stirred under nitrogen and heated to 90° C. Isophorone diisocyanate (30.5 grams, 0.14 mole) was added and reacted at 90° C. for 2.5 hours. The viscosity of the intermediate was 24.9 Pascal-second. 3-Isoccyanatopropy-ltrimethoxysilane (84.6 grams, 0.41 mol, obtained from Momentive Performance Materials under the tradename A-Link 35 silane) was added at 90° C. The mixture was stirred 1.5 hour at 90° C. The viscosity of the reaction product was 831.2 Pascal-second. Vinyltrimethoxysilane (3.0 grams) was added as a desiccant. The final viscosity was 34.2 Pascal-second.

Example 6. Resin Composition Containing Compounds with Acrylate Functional Groups and Comparative Example III Sartomer SR 295 (5.44 grams, pentaerythritol tetraacrylate, available from Sartomer), Irgacure 184 (0.23 grams, 1-hydroxycyclohexyl phenyl ketone, available from Ciba Specialty Chemicals) and n-butyl acetate (3.42 grams) were charged to a 15 mL empty glass vial. Into the mixture was added Silylated Resin A (2.91 grams). The vial was capped and agitation was applied by gently shaking the solution until the solution became visually homogeneous and clear.

Sartomer SR 295 (7.77 grams), Irgacure 184 (0.23 grams) and n-butyl acetate (4.00 grams) were charged into a 15 mL empty vial and agitated by gently shaking the solution until the solution became visually homogeneous and clear. The mixture was a control resin composition.

Both solutions were then applied on different Fisher-Brand microscope glass with a 150 micron draw down square available from Byk-Gardner. The samples were allowed to dry by completely evaporating the solvents and then placed through the UV-Curing equipment. The U.V. equipment's line speed was set to 30.5 cm per minute, with a setting of ~510 mJ/cm² fluence and ~560 mW/cm² fluence rate. Both samples were removed from the outlet zone of the UV equipment and visually inspected. The comparative example control system immediately cracked and delaminated from the glass substrate due to its brittle structure. Surprisingly, the sample incorporating the Silylated Resin A formed a clear, hard clearcoat with good adhesion to the glass substrate.

While the invention has been described above with references to specific embodiments thereof, it is apparent that many changes, modifications and variations can be made without departing from the invention concept disclosed herein. Accordingly, it is intended to embrace all such changes, modifications and variations that fall within the spirit and broad scope of the appended claims.

What is claimed is:

1. A resin composition comprising:
   (i) an organic resin containing at least one carboxylic acid ester or ether functional group; and
   (ii) a moisture-curable silylated polycarbonate resin of the general formula (I):

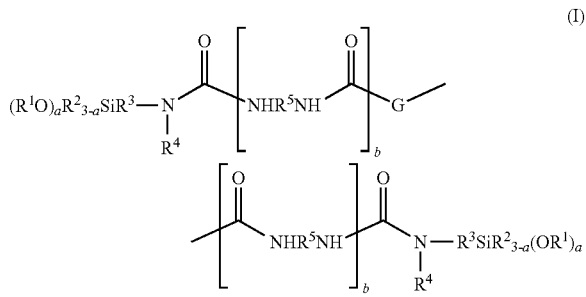

wherein:
G is a moiety of general structure (II):

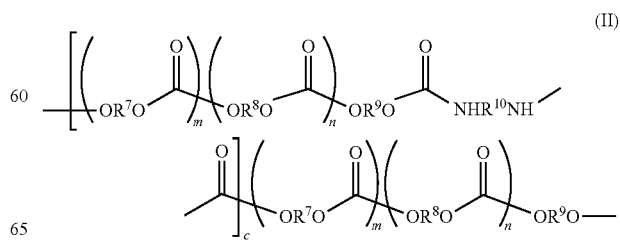

in which
 each $R^1$ is independently an alkyl group of from 1 to 6 carbon atoms;
 each $R^2$ is independently an alkyl group of from 1 to 4 carbon atoms or phenyl group;
 each $R^3$ is independently an alkylene group of from 1 to 12 carbon atoms;
 each $R^4$ is independently an alkyl group of from 1 to 6 carbon atoms, phenyl group, hydrogen or —$R^3SiR^2{}_{3-a}(OR^1)_a$ group;
 each $R^5$ is independently a divalent organic group selected from the group consisting of an alkylene group having 1 to 16 carbon atoms, a cycloalkylene group having 5 to 16 carbon atoms and the group $X^1$ having the general formula (III):

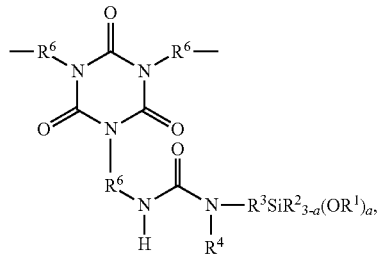

(III)

each $R^6$ is independently an alkylene group of from 1 to 12 carbon atoms or a cycloalkylene group of from 5 to 16 carbon atoms;
 each $R^7$ is an alkylene group of from 2 to 12 carbon atoms;
 each $R^8$ is an alkylene group of from 2 to 12 carbon atoms;
 each $R^9$ is independently $R^7$ or $R^8$;
 each $R^{10}$ is independently a divalent organic group selected from the group consisting of an alkylene group of from 1 to 12 carbon atoms, a cycloalkylene group of from 5 to 16 carbon atoms, $X^1$ and the group $X^2$ having the general formula (IV):

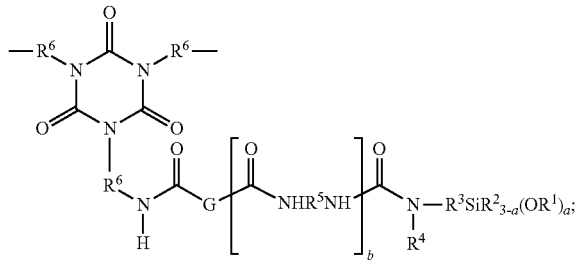

(IV)

and,
 subscripts a, b, c, m and n are integers wherein a is 1 to 3; b is 0 or 1; c is 1 to 5; m is 1 to 100; and, n is 0 to 100, with the provisos that when b is 0, $R^4$ is hydrogen; when n is 0, $R^7$ is a branched alkylene group of from 3 to 12 carbon atoms; and, when n is 1 to 100, $R^7$ and $R^8$ are different alkylene groups,
 wherein the moisture-curable silylated polycarbonate resin (ii) is soluble within the organic resin (i).

2. The resin composition of claim 1, wherein the organic resin (i) has a solubility parameter distance R' between the moisture-curable silylated polycarbonate resin (ii) and the organic resin (i) less than or equal to 9.0, and wherein this solubility parameter is calculated by the equation:

$$[4(22.5-\delta_d)^2+(9.0-\delta_p)^2+(9.0-\delta_h)2]^{0.5}=R'$$

wherein, $\delta_d$ is the Hansen dispersion solubility parameter, $\delta_p$ is the Hansen polar solubility parameter and $\delta_h$ is the Hansen hydrogen bonding parameter of the organic resin (i) determined at 25° C., and R' is the solubility parameter distance between the moisture-curable silylated polycarbonate resin (ii) and the organic resin (i).

3. The resin composition of claim 1, wherein the organic resin (i) contains at least one additional functional group selected from the group consisting of halo groups, amino groups, hydroxyl groups, carboxylic acid groups or cyano groups.

4. The resin composition of claim 1, wherein the organic resin (i) is selected from the group consisting of acrylic resins, acrylate-containing resins, epoxy resins, aminoplast resins, alkyd resins, polyester resins, vinyl ether resins, vinyl acetate resins or cellulose acetate butyrate resins.

5. The resin composition of claim 1, wherein the organic resin (i) has the general formula (V):

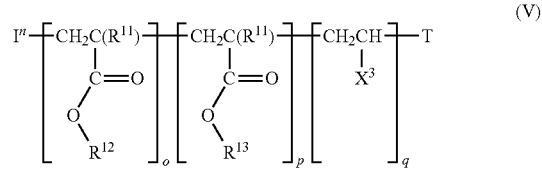

(V)

wherein
 each $R^{11}$ is independently hydrogen or methyl;
 each $R^{12}$ is independently methyl or ethyl;
 each $R^{13}$ is independently selected from the group consisting of straight chain alkyl containing from 3 to 20 carbon atoms, branched chain alkyl containing from 3 to 20 carbon atoms, cycloalkyl containing from 6 to 12 carbon atoms, aryl containing from 6 to 10 carbon atoms, aralkyl containing from 7 to 12 carbon atoms, trimethoxysilyl substituted alkyl groups, triethoxysilylalkyl groups or hydroxyl substituted alkyl groups containing from 3 to 20 carbon atoms;
 I" is an initiator decomposition moiety, more specifically the initiator group is selected from the group consisting of $R^{14}O$—, $R^{15}C(=O)O$—, $R^{16}$, where each $R^{14}$, $R^{15}$ and $R^{16}$ is hydrogen, an alkyl group of from 1 to 16 carbon atoms, a cycloalkyl group of form 6 to 10 carbon atoms, an aryl group of from 6 to 12 carbon atoms, an aralkyl group of from 7 to 12 carbon atoms or a cyano-substituted alkyl of from 1 to 6 carbon atoms;
 T is a terminal group, more specifically hydrogen, $CH_2=CH$—, $R^{14}O$—, $R^{15}C(=O)O$—, $R^{16}$ or $R^{17}S$—, where each $R^{14}$, $R^{15}$, $R^{16}$ and $R^{17}$ is hydrogen, an alkyl group of from 1 to 16 carbon atoms, a cycloalkyl group of form 6 to 10 carbon atoms, an aryl group of from 6 to 12 carbon atoms or an aralkyl group of from 7 to 12 carbon atoms;
 each $X^3$ is selected from the group consisting of $R^{18}O$—, $R^{19}C(=O)O$—, Cl—, —Cl, —C≡N, trimethoxysilyl, triethoxysilyl and phenyl, where $R^{18}$ is an alkyl group of from 1 to 16 carbon atoms, a cycloalkyl group of form 6 to 10 carbon atoms, an aryl group of from 6 to 12 carbon atoms, an aralkyl group of from 7 to 12 carbon atoms, $R^{19}$ is an alkyl group of from 1 to 16 carbon atoms, a cycloalkyl group of form 6 to 10 carbon atoms, an aryl group of from 6 to 12 carbon atoms, an aralkyl group of from 7 to 12 carbon atoms, more specifically methyl, ethyl or propyl; and the subscripts o, p and q are integers where o is from 5 to 300, p is from 0 to 300, q is from 0 to 300, more specifically, o is from 15 to 250, p is from 5 to 250 and q is 0.

6. The resin composition of claim 5, wherein the each $R^{13}$ is independently selected from the group consisting of a straight chain alkyl group containing from 3 to 6 carbon atoms, a branched chain alkyl containing from 3 to 8 carbon atoms or a hydroxyl-substituted straight chain alkyl containing 3 to 6 carbon atoms.

7. The resin composition of claim 4, wherein the organic resin (i) comprises an acrylic resin having a number average molecular weight of from 1000 to 30,000, as determined in accordance with the procedures of ASTM D5296-11, Standard Test method for Molecular Weight Averages and Molecular Weight Distribution of Polystyrene by High Performance Size-Exclusion Chromatography.

8. The resin composition of claim 4, wherein the organic resin (i) is acrylate-containing resins having the general formula (VI):

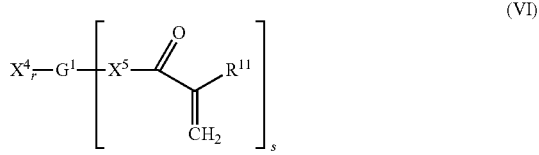

(VI)

wherein
each $R^{11}$ is independently hydrogen or methyl;
each $X^4$ is independently glycidoxy or 7-oxa-bicyclo[4.1.0]heptyl;
each $X^5$ is oxygen or —$NR^{20}$, where $R^{20}$ is hydrogen, an alkyl group of from 1 to 5 carbon atoms, cycloalkyl of from 6 to 8 carbon atoms, aryl group of from 6 to 12 carbon atoms or aralkyl of from 7 to 10 carbon atoms;
$G^1$ is a polyvalent group selected from the group consisting of an alkyl group of from 2 to 20 carbon atoms, a cycloalkyl group of from 6 to 20 carbon atoms, an aryl group of from 6 to 20 carbon atoms, an aralkyl group of from 7 to 20 carbon atoms, or a polymeric group derived from a polyurethane, polyester or acrylic polymer;
the subscripts r and s are integers, where r is from 0 to 6 and s is from 2 to 6.

9. The resin composition of claim 4, wherein the organic resin (i) comprises an acrylate-containing resin having a number average molecular weight of from 170 to 30,000 as determined in accordance with the procedures of ASTM D5296-11, Standard Test method for Molecular Weight Averages and Molecular Weight Distribution of Polystyrene by High Performance Size-Exclusion Chromatography.

10. The resin composition of claim 4, wherein the organic resin (i) is an epoxy resin having the general formula (VII):

$G^3\text{-}(X^4)_t$ (VII)

wherein
$G^3$ is a polyvalent group selected from the group consisting of a straight chain alkyl of from 2 to 18 carbon atoms, a branched chain alkyl contain from 3 to 18 carbon atoms, a cycloalkyl containing from 6 to 18 carbon atoms, an aryl, containing from 6 to 18 carbon atoms and aralkyl containing from 7 to 18 carbon atoms, an alkyl containing at least one oxa, oxo or halo group and from 4 to 18 carbon atoms, an aryl containing at least one oxa, oxo or halo group and from 4 to 18 carbon atoms;
each $X^4$ is independently glycidoxy or 7-oxa-bicyclo[4.1.0]heptyl; and
the subscript t is an integer, where t is from 2 to 6.

11. The resin composition of claim 4, wherein the organic resin (i) comprises a vinyl ether resin having the general structure of formula (VIII):

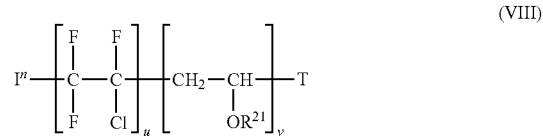

(VIII)

wherein
$I^n$ is an initiator decomposition moiety selected from the group consisting of $R^{14}O$—, $R^{15}C(=O)O$—, $R^{16}$, where each $R^{14}$, $R^{15}$ and $R^{16}$ is hydrogen, an alkyl group of from 1 to 16 carbon atoms, a cycloalkyl group of from 6 to 10 carbon atoms, an aryl group of from 6 to 12 carbon atoms, an aralkyl group of from 7 to 12 carbon atoms or a cyano-substituted alkyl of from 1 to 6 carbon atoms;

T is a terminal group, selected from the group consisting of hydrogen, $CH_2=CH$—, $R^{14}O$—, $R^{15}C(=O)O$—, $R^{16}$ or $R^{17}S$—, where each $R^{14}$, $R^{15}$, $R^{16}$ and $R^{17}$ is independently hydrogen, an alkyl group of from 1 to 16 carbon atoms, a cycloalkyl group of from 6 to 10 carbon atoms, an aryl group of from 6 to 12 carbon atoms or an aralkyl group of from 7 to 12 carbon atoms;

each $R^{21}$ is an alkyl group of from 1 to 16 carbon atoms, a cycloalkyl group of form 6 to 10 carbon atoms, an aryl group of from 6 to 12 carbon atoms, an aralkyl group of from 7 to 12 carbon atoms, $R^{19}$ is an alkyl group of from 1 to 16 carbon atoms, a cycloalkyl group of from 6 to 10 carbon atoms, an aryl group of from 6 to 12 carbon atoms or an aralkyl group of from 7 to 12 carbon atoms; and the subscripts u and v are integers where u is from 5 to 100, more specifically u is from 10 to 50 and v is from 5 to 100, more specifically v is from 10 to 50.

12. The resin composition of claim 11, wherein each $R^{21}$ is methyl, ethyl or propyl.

13. The resin composition of claim 4, wherein the organic resin (i) is aminoplast resin having the general formulae (IX), (X) or (XI):

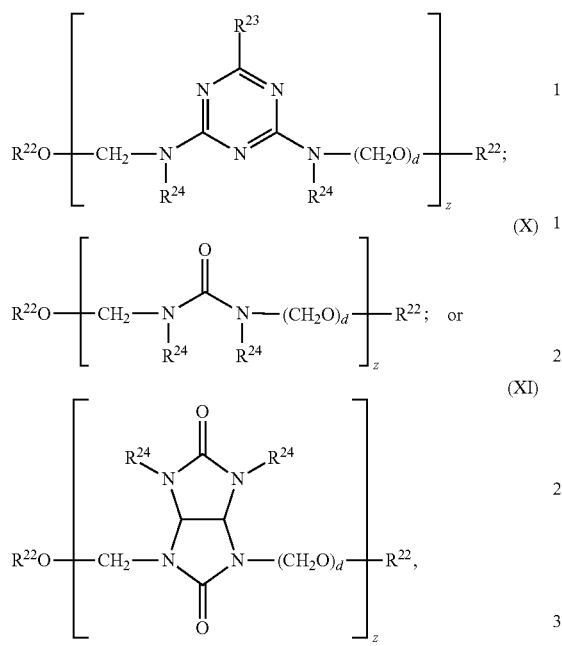

wherein
  each $R^{22}$ is independently an alkyl group having from 1 to 10 carbon atoms, a cycloalkyl group having from 3 to 10 carbon atoms, alkenyl group having from 2 to 10 carbon atoms, an aryl group having from 6 to 12 carbon atoms or an aralkyl group having from 7 to 12 carbon atoms;
  each $R^{23}$ is independently phenyl, —N(CH$_2$OR$^{22}$)$_2$ or —NH(CH$_2$OR$^{22}$);
  each $R^{24}$ is independently hydrogen or —CH$_2$OR$^{22}$; and
  each d and z is an integer, where d is 0 or 1 and z is from 1 to 40.

14. The resin composition of claim 1, wherein the moisture-curable silylated polycarbonate resin (ii) has a number average molecular weight of from 800 to 20,000 as determined in accordance with ASTM D5296-11, Standard Test Method for Molecular Weight Averages and Molecular Weight Distribution of Polystyrene by High Performance Size-Exclusion Chromatography.

15. The resin composition of claim 1, wherein $R^1$ is methyl or ethyl; $R^2$ is methylene, ethylene, propylene, 2-methylethylene or 2-methylpropylene; $R^4$ is methyl, ethyl or butyl; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is a divalent alkylene group of from 1 to 6 carbon atoms or a cycloalkylene group of from 6 to 10 carbon atoms; a is 2 or 3, b is 1, c is 0, 1 or 2; m is 5 to 15; n is 5 to 15.

16. The resin composition of claim 1, wherein $R^1$ is methyl or ethyl; $R^2$ is methylene, ethylene, propylene, 2-methylethylene or 2-methylpropylene; $R^4$ is methyl, ethyl or butyl; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is

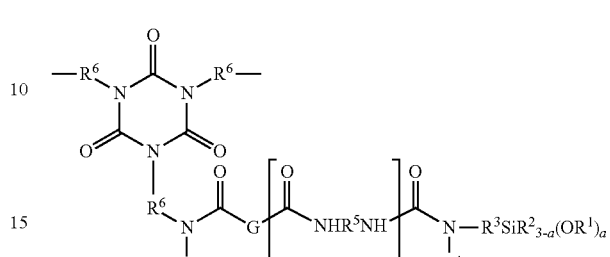

a is 2 or 3, b is 1, c is 0, 1 or 2; m is 5 to 15; n is 5 to 15.

17. The resin composition of claim 1, wherein $R^1$ is methyl or ethyl; $R^2$ is methylene, ethylene, propylene, 2-methylethylene or 2-methylpropylene; $R^4$ is hydrogen; $R^5$ is divalent alkylene group of from 1 to 6 carbon atoms or a cycloalkylene group of from 6 to 10 carbon atoms; $R^7$ is 1,4-butylene, 1,6-hexylene or 1,8-octylene; $R^8$ is 1,5-hexylene, 1,7-heptylene or 1,9-nonylene; $R^{10}$ is a divalent alkylene group of from 1 to 6 carbon atoms or a cycloalkylene group of from 6 to 10 carbon atoms; a is 2 or 3, b is 0, c is 0, 1 or 2; m is 5 to 15; n is 5 to 15.

18. The resin composition of claim 1, wherein a is 3 and b is 1; $R^1$ is methyl; $R^2$ is methyl; $R^3$ is 2-methyl-1,3-propylene; $R^4$ is ethyl; $R^5$ is isophoronyl group; m is 6.0; n is 7.7, c is 1; $R^6$ is 1,3-propylene; $R^7$ is 1,6-hexylene; $R^8$ is 1.5-pentylene; $R^9$ is 1,5-pentylene and $R^{10}$ is trivalent 1,3,5-(3-methylene-3,5,5-trimethyl-cyclohexyl)-[1,3,5]-triazinane-2,4,6-trione group.

19. The resin composition of claim 1, wherein the moisture-curable silylated polycarbonate resin (ii) is present in an amount of from about 1 to 50 weight percent, based on the total weight of the organic resin(s) (i) and moisture-curable silylated polycarbonate resin(s) (ii).

20. The resin composition of claim 1, further comprising at least one additional component selected from the group consisting of organoalkoxysilanes, silicone hardcoats, pigments, curing catalysts, leveling agents, antioxidants, UV stabilizers, crosslinkers, dyes, fillers, adhesion promoters or solvents.

21. The resin composition of claim 1, wherein said resin composition is a coating composition.

22. A coating having the composition of claim 1.

23. The coating of claim 22, wherein the coating is paint.

24. The coating of claim 23, wherein the paint is automotive paint.

25. A substrate, coated with the composition of claim 1.

26. The resin composition of claim 1 comprising a synergistic combination of resin (i) and resin (ii).

27. The resin composition of claim 26, exhibiting synergy in gloss retention, weatherability or adhesion, compared to the properties of resin (i) without the addition of resin (ii) and/or greater than the additive weight percent of resin (i) and resin (ii).

* * * * *